United States Patent
Chesley et al.

(10) Patent No.: US 7,065,553 B1
(45) Date of Patent: Jun. 20, 2006

(54) PRESENTATION SYSTEM WITH DISTRIBUTED OBJECT ORIENTED MULTI-USER DOMAIN AND SEPARATE VIEW AND MODEL OBJECTS

(75) Inventors: Harry R. Chesley, San Francisco, CA (US); Greg Kimberly, Seattle, WA (US); Anoop Gupta, Medina, WA (US); Manuel Vellon, Bellevue, WA (US); Steven M. Drucker, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 653 days.

(21) Appl. No.: 09/644,321

(22) Filed: Aug. 23, 2000

Related U.S. Application Data

(63) Continuation of application No. 09/088,246, filed on Jun. 1, 1998.

(51) Int. Cl.
*G06F 9/00* (2006.01)

(52) U.S. Cl. ............ 709/205; 709/203; 709/204; 709/217; 709/219; 345/418; 463/1

(58) Field of Classification Search ........ 709/203–207, 709/26–27, 217–219; 719/303–305; 706/46–47, 706/60–61; 345/418; 463/1
See application file for complete search history.

(56) References Cited

U.S. PATENT DOCUMENTS

| | | | | |
|---|---|---|---|---|
| 5,835,911 A | * | 11/1998 | Nakagawa et al. | ......... 707/203 |
| 5,878,415 A | * | 3/1999 | Olds | ............................ 707/9 |
| 5,884,029 A | * | 3/1999 | Brush et al. | ................. 709/202 |
| 5,890,139 A | * | 3/1999 | Suzuki et al. | .................. 705/27 |
| 5,897,622 A | * | 4/1999 | Blinn et al. | .................... 705/26 |
| 5,926,798 A | * | 7/1999 | Carter | ......................... 705/26 |
| 5,930,764 A | * | 7/1999 | Melchione et al. | ........... 705/10 |

(Continued)

OTHER PUBLICATIONS

Meyer et al., "A Moo-Based Collaborative Hypermedia Systems for WWW", 1994, WWW.NCSA.UIUC.EDU, Pages.*

(Continued)

*Primary Examiner*—Bunjob Jaroenchonwanit
*Assistant Examiner*—Alina Boutah
(74) *Attorney, Agent, or Firm*—Microsoft Corporation

(57) ABSTRACT

A database of objects is distributed between a server computer and multiple client computers as an object oriented virtual world environment (VWE) with multimedia presentation features. A primary database is maintained on the server and includes at least one entry for each object disposed within the VWE. In one implementation a presentation virtual world environment has a multi-user virtual presentation room object (ShowRoom) in which presentation or information element objects (ShowItems) are presented from a server to multiple viewers at multiple client computers. The presentation room object and presentation element objects are global objects in that they are provided from server to client computers as part of a presentation VWE. The presentation element objects provide a model representing a presentation in the presentation VWE. Interface objects at the client computers provide a view of the presentation, with user interface and control elements, which view is separate from the model provided by the presentation element objects.

12 Claims, 14 Drawing Sheets

U.S. PATENT DOCUMENTS

| | | | |
|---|---|---|---|
| 5,933,811 A * | 8/1999 | Angles et al. | 705/14 |
| 5,940,820 A * | 8/1999 | Kagiwada | 707/3 |
| 5,948,040 A * | 9/1999 | DeLorme et al. | 701/201 |
| 5,956,038 A * | 9/1999 | Rekimoto | 345/419 |
| 5,956,039 A * | 9/1999 | Woods et al. | 345/419 |
| 5,956,483 A * | 9/1999 | Grate et al. | 709/203 |
| 5,960,411 A * | 9/1999 | Hartman et al. | 705/26 |
| 5,974,398 A * | 10/1999 | Hanson et al. | 705/14 |
| 5,978,567 A * | 11/1999 | Rebane et al. | 709/219 |
| 6,020,885 A * | 2/2000 | Honda | 345/757 |
| 6,023,270 A * | 2/2000 | Brush et al. | 345/741 |
| 6,057,856 A * | 5/2000 | Miyashita et al. | 345/633 |
| 6,106,399 A * | 8/2000 | Baker et al. | 463/42 |
| 6,119,147 A * | 9/2000 | Toomey et al. | 709/204 |
| 6,166,732 A * | 12/2000 | Mitchell et al. | 715/733 |
| 6,175,842 B1 * | 1/2001 | Kirk et al. | 715/513 |
| 6,219,045 B1 * | 4/2001 | Leahy et al. | 715/757 |
| 6,268,872 B1 * | 7/2001 | Matsuda et al. | 345/473 |
| 6,301,584 B1 * | 10/2001 | Ranger | 707/103 R |
| 6,476,830 B1 * | 11/2002 | Farmer et al. | 715/769 |
| 6,496,851 B1 * | 12/2002 | Morris et al. | 709/204 |
| 6,560,707 B1 * | 5/2003 | Curtis et al. | 713/163 |
| 6,611,822 B1 * | 8/2003 | Beams et al. | 706/11 |
| 6,681,371 B1 * | 1/2004 | Devanbu | 715/515 |
| 6,772,195 B1 * | 8/2004 | Hatlelid et al. | 709/204 |
| 6,785,708 B1 * | 8/2004 | Busey et al. | 709/204 |
| 6,785,891 B1 * | 8/2004 | Allen et al. | 719/313 |
| 6,912,565 B1 * | 6/2005 | Powers et al. | 709/205 |
| 6,938,069 B1 * | 8/2005 | Narayanaswamy | 709/204 |
| 2001/0019337 A1 * | 9/2001 | Kim | 345/757 |
| 2001/0037367 A1 * | 11/2001 | Iyer | 709/204 |
| 2002/0013813 A1 * | 1/2002 | Matsuoka | 709/204 |
| 2005/0193120 A1 * | 9/2005 | Taylor | 709/227 |

OTHER PUBLICATIONS

Pavel et al., "MUDs Grow Up: Social Virtual Reality in the Real world", IEEE, 1994, pp. 193-200.*

* cited by examiner

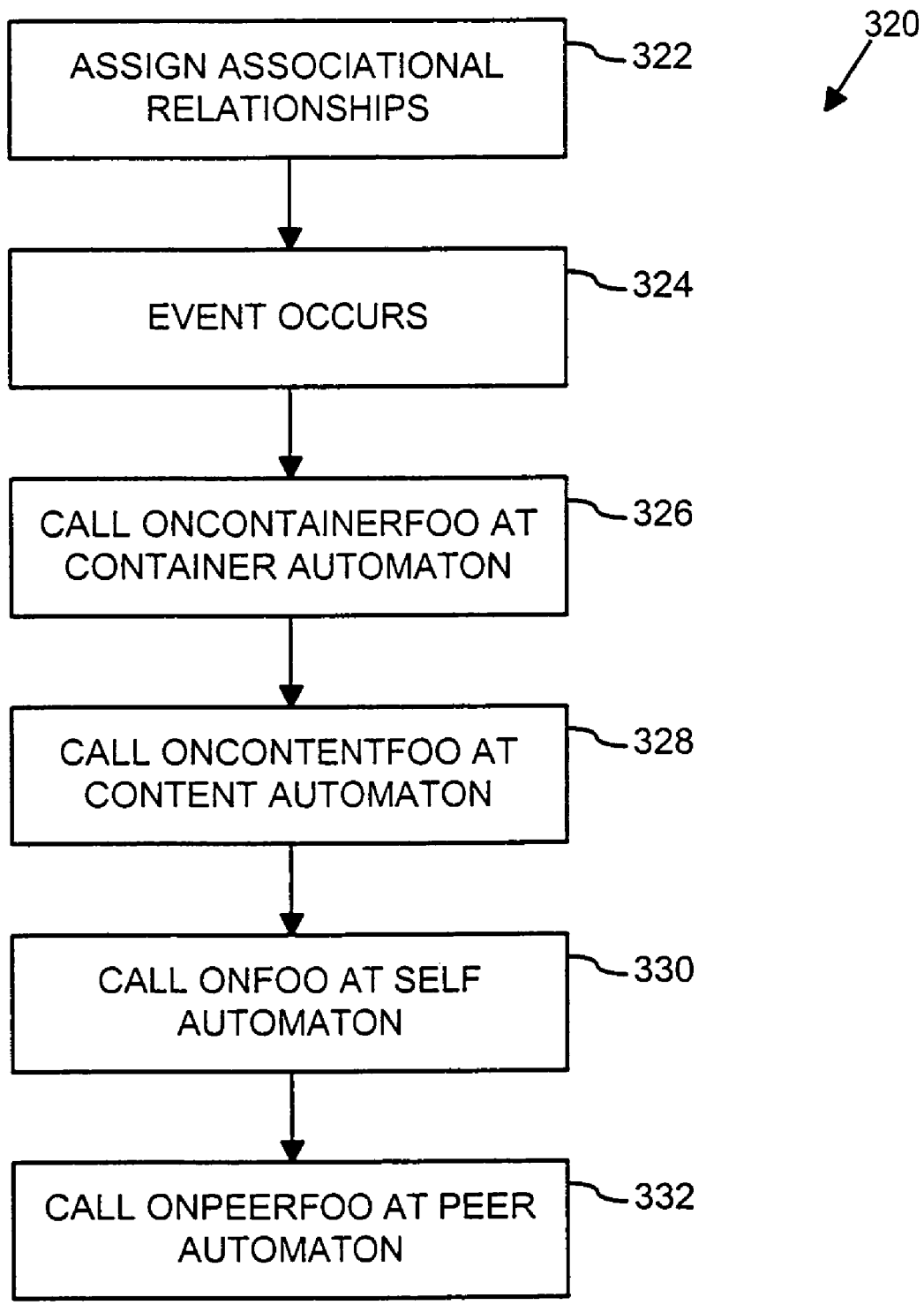

PRESENTATION SYSTEM WITH DISTRIBUTED OBJECT ORIENTED MULTI-USER DOMAIN AND SEPARATE VIEW AND MODEL OBJECTS

This is a continuation of application Ser. No. 09/088,246, filed Jun. 1, 1998.

FIELD OF THE INVENTION

The present invention relates to object oriented multi-user domains and, in particular, to distributing the objects of such a domain between a server and multiple clients and providing the objects with multimedia presentation features.

BACKGROUND AND SUMMARY OF THE INVENTION

A virtual world represents a real or imaginary place using graphics, images, video, force feedback, and audio data to define a representation of the place on a computer for one or more users. Typically, the virtual world enables multiple users to simultaneously perceive and interact with the virtual world and with each other through different computers that are connected by a network.

Large-scale virtual worlds have been developed for two different kinds of systems: military simulation networks and text-based multi-user worlds or domains known as MUDs. A military simulation network known as SIMNET is based on vehicle and flight simulators that generate real-time 3-D images of a virtual world. A peer-to-peer network protocol allows simulators to place other users' vehicles and projectiles during virtual battle simulations.

A distinction of such a military simulation network is that complete graphical representations are transmitted to all users simultaneously. While transmitting complete graphical representations in applications such as military simulation can require extensive network bandwidth, transmission of complete graphical representations is also used in lower bandwidth applications such as VRML. It will be appreciated, however, that with the bandwidth requirements of a modeling language such as VRML it does not have a way to provide simultaneous full-featured control to large number of users.

Text-based MUDs maintain long term persistent worlds on a central server that is accessed via clients. An object oriented MUD, referred to as a MOO, is a network database server that stores text objects having properties and methods. The topology of the space in a MOO is defined by room objects that represent discrete locations and are interconnected by portal objects. Objects in a MOO can also represent things located in a room, and objects called players or avatars represent the users' characters in the world. Users in the same room are able to talk by typing text and reading the text that others type.

Text-based MUDs and MOOs are capable of providing a rich virtual world experience, but that experience could be further enhanced by graphical and other multimedia presentation characteristics (e.g., graphics, audio, force feedback, etc.). A difficulty is the volume of data required to provide a virtual world experience simultaneously to multiple users, particularly large numbers of users. While even a server of modest capability (e.g., 100 MHz Pentium processor) is capable of supporting a text-based MUD or MOO for up to about 300 users, a multimedia MUD or MOO would require significantly greater server processing power and significant network bandwidth as well.

Some graphical virtual world systems, including graphical chat systems, overcome the server power and network bandwidth requirements by requiring that much of the virtual world be immutable and transmitted to the user's client in an initial download. Subsequent updates that are transmitted from the server to the clients are of only limited feature changes, such as changing positions of entities or objects within a fixed space. Some multi-user 3D games (e.g., Doom, Duke Nukem, Quake, etc.) utilize such multicasting of player-state messages to provide fast action performance. However, these games lack the persistence of text-based MUDs and MOOs in which user characteristics, such as the attributes and properties of entities controlled by a user, are maintained in a server database as a part of the MUD or MOO. By fixing much of the virtual world and by lacking user entity persistence, such multi-user games lack the richness available within a MUD or MOO virtual world environment.

In accordance with the present invention, therefore, a database of objects distributed between a server computer and multiple client computers supports an object oriented virtual world environment (VWE) with multimedia presentation features. It will be appreciated that a VWE in this context is not limited to the recreational applications, such as multi-user games or chats that are associated with MOOs. A VWE in this context is also applicable to multi-user collaboration in simulations, designs, or modeling, multi-user participation in presentations or demonstrations, as well as other non-recreational applications.

A primary database is maintained on the server and includes at least one entry for each object disposed within the VWE. Typically, each client has an object that functions as the point of access to the database for the user of the client. In a VWE implementation the point of access object for each client is an avatar (i.e., a virtual being or entity) that is associated with the user.

In one implementation a presentation virtual world environment has a multi-user virtual presentation room object (ShowRoom) in which presentation or information element objects (ShowItems) are presented from a server to multiple viewers at multiple client computers. The presentation room object and presentation element objects are global objects in that they are provided from server to client computers as part of a presentation VWE. The presentation element objects are provided from one or more presenting users, who each may also be at a client computer.

As one example, the presentation VWE may be used to convey information from relatively few presenters to relatively many viewers, as in an educational or professional presentation. As another example, most or all of the users of presentation VWE may be presenters who are collaborating on a particular project. Information about each individual presenter and viewer is maintained in association with a corresponding avatar object.

Each client computer includes interface objects (Showlets) that communicate with presentation element objects to render corresponding information or presentation features at the viewer's client computer (e.g., displays, multimedia information, or other outputs) and to pass to the presentation element objects information (e.g., queries or responses) from the viewers at the client computers. The presentation element objects provide a model representing a presentation in the presentation VWE. The interface objects provide a view of the presentation, with user interface and control elements, which view is separate from the model provided by the presentation element objects.

Separating the model represented by the presentation element objects from the view provided by the interface objects allows a multi-user object oriented user domain such as a presentation VWE to be rendered easily and efficiently while also allowing information to be obtained from the multiple users. In one implementation each active presentation element object has a one-to-one relationship with an interface object, and the pair have mutual object references that tie them together. The one-to-one relationship between these objects provides encapsulation of the interface implementation separate from the presentation element (i.e., functional) implementation and from other interface objects. This allows independent development of different interface items. It also allows different interfaces to be attached to the same presentation element at different times or for different viewers (e.g., "presenter" versus "viewer" or "audience"). And it allows different implementation technologies to be used for functional and representational items (e.g., scripting or C++ for function, and DHTML for representation). Moreover, interface objects are a compact and versatile manner of distributing and implementing user interface and control functionality.

A conventional software object provides software services, such as methods or properties, that are accessed by one or more interfaces. A method is typically a function or procedure that performs a specific action and is called via a corresponding interface. A property is typically information or data and is also called via a corresponding interface. Conventional objects include the characteristic of interface inheritance in which the definitions of the methods that an interface supports may be inherited by another interface. The interfaces may be of different objects that may or may not be of the same class of objects. An object supporting an inherited interface can be treated like the object from which the interface is inherited. Such objects may be implemented by or in accordance with many object-oriented programming tools or models including, for example, the component object model (COM).

An interface of an object may not be changed once the design and implementation of the interface is complete and the object is established, distributed, or promulgated for general run-time use. Adding new services to or modifying existing services in such an object requires that a new interface be defined in a design-time operation. The new interface would then be distributed or promulgated for general run-time use. The new interface may inherit services from an existing interface, but the new interface remains distinct and has a unique identifier. Despite interface inheritance, therefore, interfaces remain static once they have been established, distributed, or promulgated for use at run-time.

An implementation of the present invention provides, therefore, that object services like methods or properties are provided to or inherited by objects dynamically during run-time. This dynamic inheritance may be provided within the context of an object model, such as the Component Object Model, that supports only design-time inheritance. As applied in a virtual world environment, for example, dynamic inheritance can provide users with increased levels of interaction or control.

In a method of providing dynamic inheritance, hierarchical relationships are defined between multiple objects such that each object references or is referenced by another object. One of the objects is a root object that is referenced by at least one other object but that does not reference another object. A call is made for a particular service (e.g., a method or property) at a selected object. The service is provided directly from the object whenever the service is available therefrom.

Whenever the selected service is unavailable at the selected object, the call is passed to a referenced object (i.e., an object that is referenced by the selected object). The service is provided directly from the referenced whenever the service is available therefrom or the call is passed to yet another referenced object until the service can be provided. The call may be passed to multiple successive referenced objects until the call reaches the root object, which either provides the service or the service is deemed unavailable.

Another aspect of dynamic inheritance is that an object, such as the root object, may include one or more methods for adding or otherwise changing the methods or properties available from that object. The changes in the methods or properties may be made at run-time, after the object has been otherwise fixed or established.

In one implementation, the interface includes an AddMethod method that adds a designated method to the interface at run-time to make the method available from the interface. Similarly, the interface includes an AddProperty method that adds a designated property to a designated interface at run-time to make the property available from the interface. An InvokeMethod method allows a user to execute the designated method, and other methods can allow other access to and control over the methods and properties. Methods and properties available for implementation or access by these dynamic inheritance methods may be in a dynamic inheritance listing, such as a table, that indicates the names of the methods and properties, defines the services they provide, and includes unique identifiers for them.

The updating of local object databases at client computers and dynamic inheritance of this invention cooperate to provide a persistent object oriented multi-user domain capable of supporting multimedia presentation features for large numbers of users over conventional networks like the Internet. This includes distributing the objects of such a domain between a server and multiple clients and providing the objects with multimedia presentation features. Such a domain includes the persistence of conventional text-based MUDs and MOOs while also giving users the ability to vary or control a wide range of object attributes and properties. As a result, multimedia (e.g., graphical) presentation capabilities are combined with persistence and variability features of text-based MUDs and MOOs to provide a rich, dynamic, multimedia virtual world environment suitable for standard networks.

Additional objects and advantages of the present invention will be apparent from the detailed description of the preferred embodiment thereof, which proceeds with reference to the accompanying drawings.

BRIEF DESCRIPTION OF THE DRAWINGS

FIG. 16 is a flow diagram illustrating a latebound event mechanism process in which event notifications and associated methods may be promulgated among objects in a dynamic, run-time manner.

DETAILED DESCRIPTION OF PREFERRED EMBODIMENT

Figure 1:
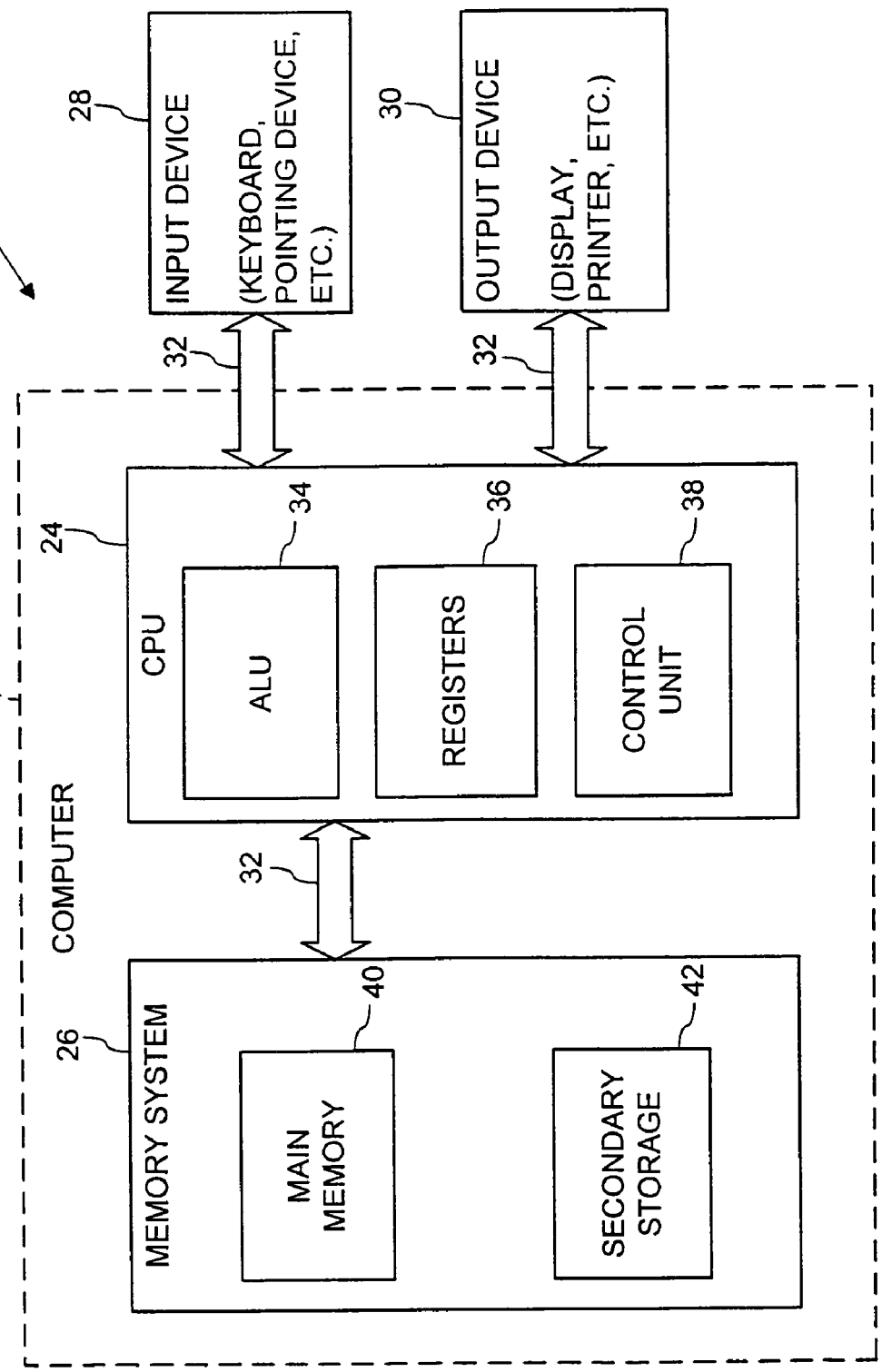
FIG. 1 is a block diagram of a computer system that may be used to implement the present invention.

FIG. 1 illustrates an operating environment for an embodiment of the present invention as a computer system 20 with a computer 22 that comprises at least one high speed processing unit (CPU) 24 in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPC from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28 and 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed and may be associated with the operating system or the application program as appropriate. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

Figure 2:
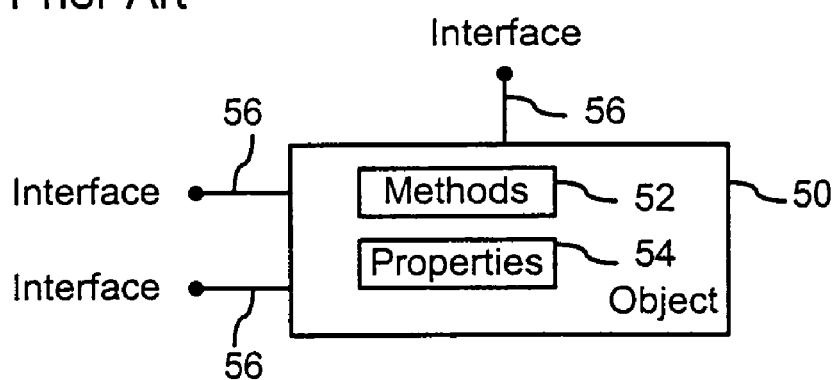
FIG. 2 is a block diagram of a prior art interfaced software object.

FIG. 2 is a block diagram of an exemplary prior art interfaced software object 50 that provides software services such as methods 52 or properties 54 that are accessed by one or more interfaces 56 (multiple shown). A method 52 is typically a function or procedure that performs a specific action and is called via a corresponding interface 56. Properties 54 (also referred to as states or attributes) typically are information or data and are called via a corresponding interface 56. Object 50 is implemented in a server that, for example, may be a dynamic link library utilized by software program or may be an entirely separate executable process.

Each object 50 is an instance of a specific class of related objects. Exemplary object 50 also includes the characteristics of encapsulation, polymorphism, and inheritance. Object 50 encapsulates its properties 54 so each property 54 is accessed only through one of methods 52, thereby protecting the properties (or data) from inappropriate access and errors that can arise therefrom. Object 50 supports polymorphism in that object 50 may present to a software client an interface or a method definition that appears to the client to be the same as an interface or a method definition of another object in a different class. Such interfaces or method definitions of different objects may appear the same to the client of even if the resulting methods have different implementations.

And object 50 also includes interface inheritance in which the definitions of the methods that object 50 supports may be inherited by another object. Interface inheritance simplifies implementation of polymorphism because an object supporting an inherited interface can be treated like the object from which the interface is inherited. Object 50 may be implemented by or in accordance with many object-oriented programming tools or models including, for example, the component object model (COM). COM is a foundation for object oriented technologies such as OLE and ActiveX utilized by Microsoft Corporation and others. By way of example, the following description is made with reference to an object 50 implemented according to COM, but is similarly applicable to other object-oriented programming tools or models of similar characteristics.

Interfaces 56 of object 50 may not be changed once object 50 is established, distributed, or promulgated for general use at run-time. Adding new services to or modifying existing services in such an object 50 requires that a new interface be defined. The new interface may inherit services from an existing interface, but the new interface remains distinct and has a unique identifier. As a result, interfaces 56 are static. While being a limit on the extensibility of objects, static interfaces provide stability and predictability in the use of objects.

Figure 3:
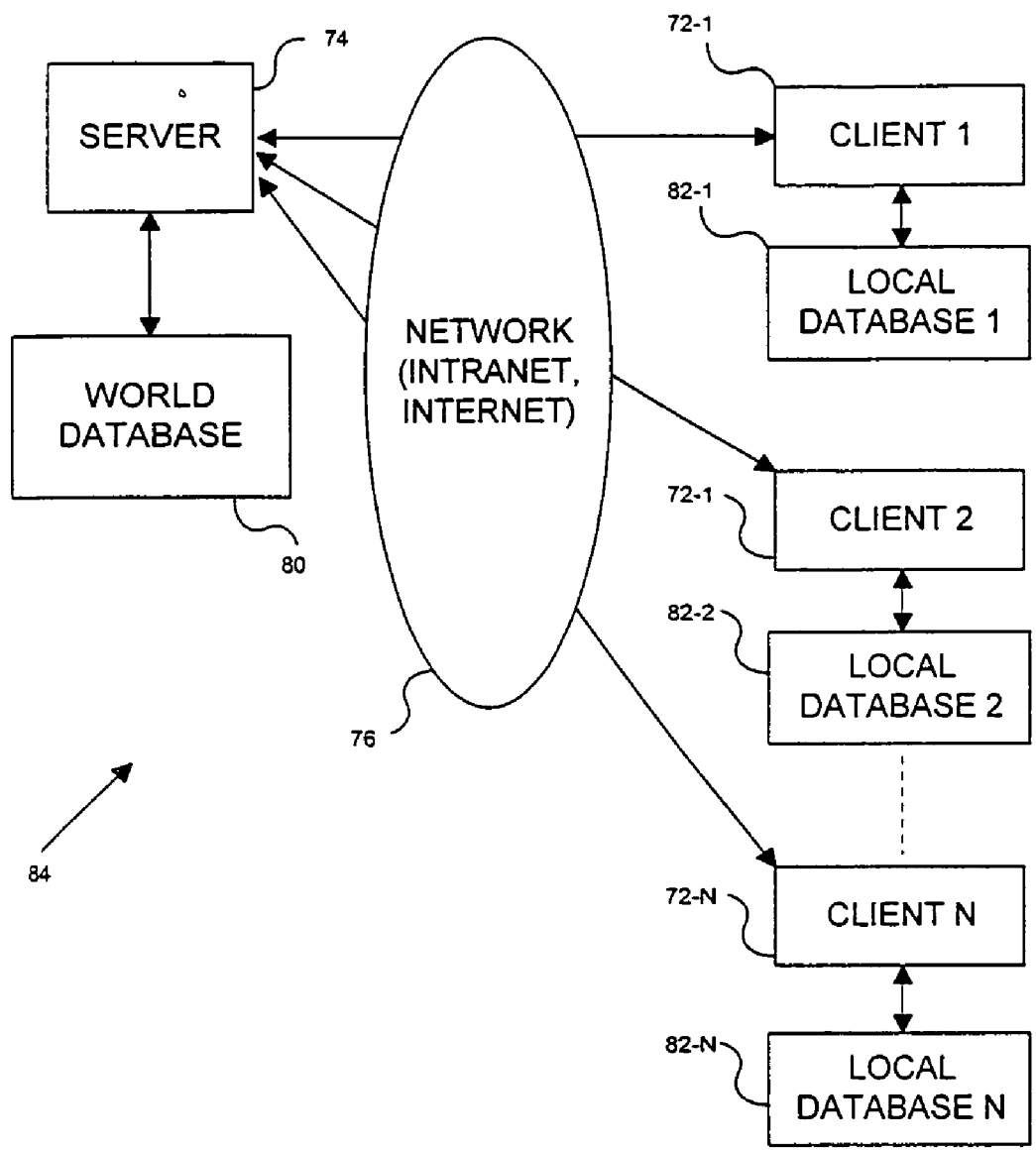
FIG. 3 is an exemplary view of the client-server architecture showing the world database maintained by the server computer, and local databases maintained by each of n client computers.

FIG. 3 is a block diagram illustrating a client-server architecture as an operating environment for a distributed object database according to the present invention. Multiple client computers or clients 72 are in communication with a server computer or server 74 via a network 76, such as a LAN, WAN, intranet, or the Internet. Clients 72 and server 74 have, for example, the basic configuration illustrated in FIG. 1, but may include component variations as is known in the art. As a distributed object database, server 74 maintains a central or world object database 80 while clients 72 maintain local object databases 82. World object database 80 and local object databases 82 together form a distributed object database 84.

For purposes of illustration, distributed object database 84 will be discussed with reference to a representation of an interactive virtual world environment (VWE) or domain. The VWE represents a real or imaginary place using graphic and audio data that are presented to a computer user. World object database 84 comprises objects that correspond to particular types of entities or articles within the environment. It will be appreciated, however, that this illustration does not limit the applicability of dynamic inheritance between interfaces to a VWE and that dynamic inheritance of this invention can be used with interfaces and objects for other representations, models, or schemes.

Figure 4:
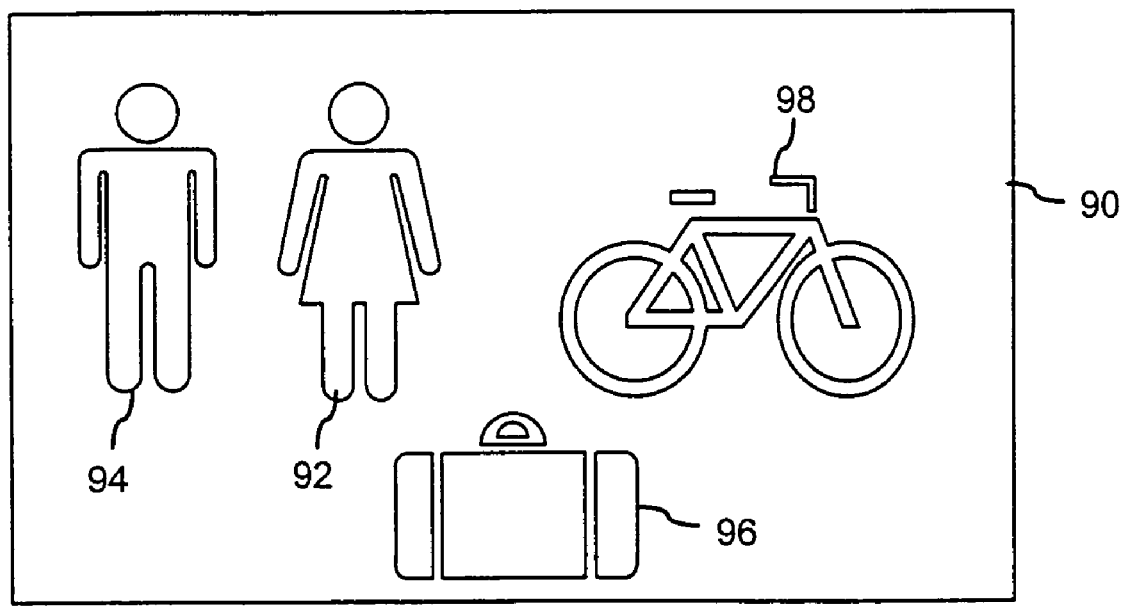
FIG. 4 is a schematic illustration of an exemplary area or space or room within a virtual world environment.

FIG. 4 is a schematic illustration of an exemplary area or space or room 90 within a virtual world environment that represents a real or imaginary place using graphic and audio data that are presented to a computer user. Room 90 may be rendered on a display (e.g., display 30) or may represent information or data held within a memory system (e.g., memory system 26). Room 90 has within it several items or entities including first and second avatars 92 and 94 that each represents a different user, a container article or artifact 96 that can hold or contain other articles or artifacts or entities (none shown), and another article or artifact 98 that is not a container for holding other entities. In this regard, entities are the graphical beings, articles, and even space or room within the virtual world environment, as well as the underlying objects and interfaces for implementing them.

World database 84 maintains a complete and centralized representation of the VWE and includes all objects disposed therein. A first client 72-1 maintains a first local database 82-1, which includes a subset of the information contained in world database 80. First local database 82-1 need only contain those objects that may potentially affect objects associated with first client 72-1. A second client 72-2 maintains a second local database 82-2 that contains information about objects that may potentially affect objects associated with that client, and thus may be different in its information content than first local database 72-1. Moreover, server 74 is shown coupled to an N-th client 72-N having an N-th local database 82-N, to indicate that an indeterminate number of other clients can be coupled to server 74 for interaction in the VWE.

Portions of world database 84 maintained on server computer 74 are downloaded to each of multiple individual client computers 72 and are included in each of multiple corresponding local databases 82. Objects in the local databases 82 may be selected by a user or rendered by an application on a display associated with the corresponding client 72. The user may view and manipulate the objects, e.g., by adding, deleting, or moving the objects within the VWE. Manipulation of or changes to objects in the local databases 82 are communicated to the world databases maintained on the server computer 74. Updates to the world database 84 due to changes at the client computers 72 are handled automatically and dynamically by server computer 74.

The local database 82 maintained by each client computer 72 corresponds to the portion of the VWE that is within the potentially immediate perception of one or more objects associated with the user (e.g., avatar 92). The remainder of the world database 84, which corresponds to the remaining portion of the VWE that is outside the potentially immediate perception of a user's avatar, is of no consequence to the user and is not maintained in the local database 82 on that userr's client computer 72. Accordingly, changes to the VWE represented by world database 84 are provided to the local databases 82 of users with associated objects (e.g., avatars) that may potentially sense the changes. The local databases 82 of users with associated objects (e.g., avatars) that cannot potentially sense the changes are not updated with changes to the VWE represented by world database 84.

For example, a user can move an object (such as avatar 92) that is associated with the user from an old location (such as room 90) through a portal to a new location (such as a connected room). This will cause server computer 74 to update local database 82 on the client computer 72 of the user with the information for portraying the other objects that the user's object (avatar 92) can potentially sense in the new location. Further, client computers 72 of users associated with other objects in the old and new locations will receive a selectively determined update that depicts the potential presence or absence of the moved object. A client computer containing an entry for an object in its local database following such an update may sense and display the object without further communication from the server computer.

Further, the server can actually comprise a network of distributed servers to scale resource capacity as necessary to efficiently administer the world database. The use of distributed servers to administer the world database would thereby provide dynamic scaling of resources to match the number of users participating in the VWE. Also, another feature of the claimed invention is that the server can anticipate the need for an update to a particular local database, so that synchronous "handshakes," which would require frequent bi-directional exchanges between the clients and the server, are dramatically reduced, and computational and data transmission resources of the server and client, and of the network may be more efficiently employed. However, not all data need be marshalled. Large, immutable data at like texture maps, sound files, and geometric models may be referred to by network addresses (e.g., URLs), and the server or clients may download them over a network (e.g. the Internet).

The present invention incorporates some of the more desirable characteristics of a MUD and a client-server architecture, so that an extremely extensible VWE can be presented to the user. The server computer administers a world database that contains the properties for each object associated with all of the users. Further, when a change occurs in the VWE, the server computer updates the VWE representation on the client computers only for the users that are affected by the change in their "bystander region," i.e., only for a change that an object such as an avatar that is associated with a user can potentially sense. Also, the ability of a particular object to sense a specific type of change in the VWE is determined by the properties of the object that are contained in the local database.

Accordingly, the present invention solves the problem of reducing server computational and data transmission resource demands, by only providing updates of a changed object to clients associated with objects that include the changed object within their bystander regions. Moreover, the object based VWE of the present invention is very expandable so that it can accommodate an extremely large number of users, spread throughout a number of different regions or rooms in the VWE.

An implementation of the present invention further provides that object services like methods or properties are provided to or inherited by objects dynamically during run-time. This dynamic inheritance may be provided within the context of an object model, such as the Component Object Model, that supports only design-time inheritance. As applied in a virtual world environment, for example, dynamic inheritance can provide users with increased levels of interaction or control.

In a method of providing dynamic inheritance, hierarchical relationships are defined between multiple objects such that each object references or is referenced by another object. One of the objects is a root object that is referenced by at least one other object but that does not reference another object. A call is made for a particular service (e.g., a method or property) at a selected object. The service is provided directly from the object whenever the service is available therefrom.

Whenever the selected service is unavailable at the selected object, the call is passed to a referenced object (i.e., an object that is referenced by the selected object). The service is provided directly from the referenced whenever the service is available therefrom or the call is passed to yet another referenced object until the service can be provided. The call may be passed to multiple successive referenced objects until the call reaches the root object, which either provides the service or the service is deemed unavailable.

Further in accordance with an implementation of the present invention, a dynamic or latebound event mechanism provides event mechanism operation according to associational relationships among objects. In addition, objects may be responsive to event notification methods that are not initially within the original object definition, thereby allowing the event notification methods to be inherited by objects dynamically during run-time. This latebound event mechanism and dynamic inheritance may be provided within the context of an object model, such as the component object model, that supports only design-time interface inheritance. As applied in a virtual world environment, for example, latebound event mechanism and dynamic inheritance can provide users with increased levels of interaction or control.

In applying the latebound event mechanism of this invention to a virtual world environment, for example, the objects may correspond to the entities that would arise within the virtual world environment. The objects have associational relationships primarily representing the physical or corporeal distinctions between entities. One implementation utilizes the associations Self, Contents, and Peer. Each typical being or article entity is its own Self relative to and separate from other entities. The space or room of the virtual world environment has those entities as its contents and hence has a Contents association. Typical being or article entities are Peers of each other within a space or room. Another aspect of this particular implementation is that entities are capable of containing one or more other article entities. While such a Container entity would also be a Peer of the other entities, it is assigned to an associational class Container to reflect its functionality.

Event notification methods are promulgated among the objects corresponding to the entities in a sequence based upon the associational relationships between the entities. For an event fired or triggered with regard to one of the entities within the virtual world environment, an event notification method is passed to any objects within any Container entity before event notification methods are promulgated to objects of other entities. An event notification method is then passed to objects within the object corresponding to the Content entity. Event notification methods are then passed successively to the objects corresponding to the Self and any Peer entities.

The updating of local object databases at client computers, dynamic inheritance, and event notification methods of this invention cooperate to provide a persistent object oriented multi-user domain capable of supporting multimedia presentation features for large numbers of users over conventional networks like the Internet. This includes distributing the objects of such a domain between a server and multiple clients and providing the objects with multimedia presentation features. Such a domain includes the persistence of conventional text-based MUDs and MOOs while also giving users the ability to vary or control a wide range of object attributes and properties. As a result, multimedia (e.g., graphical) presentation capabilities are combined with persistence and variability features of text-based MUDs and MOOs to provide a rich, dynamic, multimedia virtual world environment suitable for standard networks.

Figure 5:
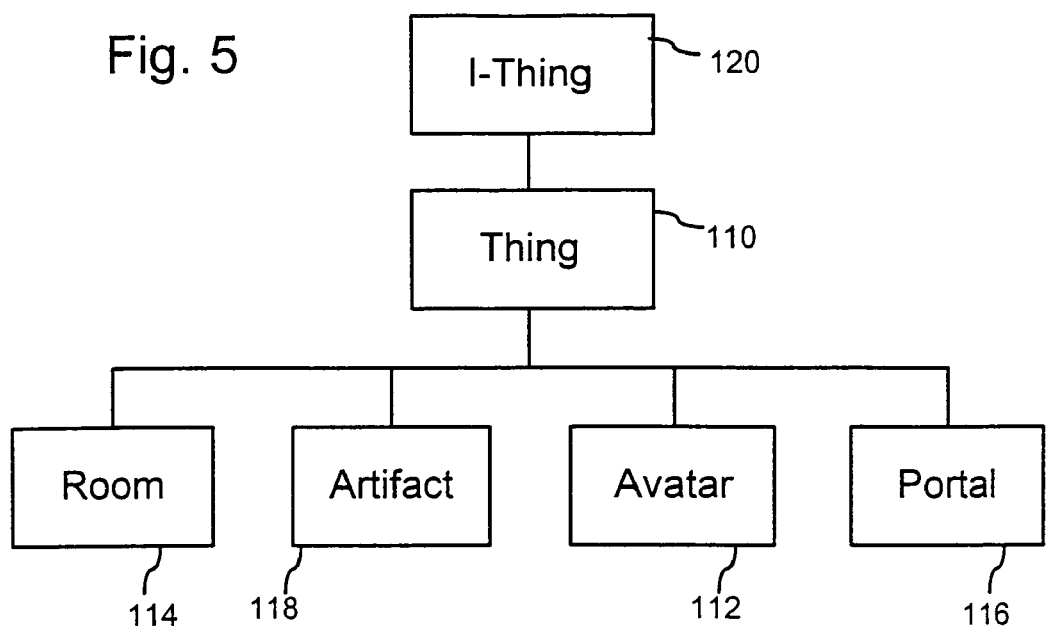
FIG. 5 is a block diagram representing hierarchical inheritance relationships between an exemplary set of objects.

FIG. 5 is a block diagram illustrating hierarchical inheritance relationships between an exemplary set of objects 110–118 corresponding to entities 90–98 of FIG. 4 and representing abstractions that include data and the operations associated with that data. Entities 90–98 are represented by instances of objects 110–118 of an interactive virtual world environment and correspond to particular types of entities or articles within the environment. Objects 110–118 have hierarchical inheritance relationships between them that may be used to extend the latebound event mechanism, as described below in greater detail. Objects 110–118 are based upon an interface 120 (designated I-Thing) that in one implementation is a COM object interface. It will be appreciated, however, that I-Thing interface 120 could alternatively be implemented according to other object models.

Objects 110–118 are the basic objects or types from which other objects inherit services and are called the exemplars for the virtual world environment or representation. Object 110 (designated Thing) is the root or core of the set of all interfaces in the representation. Object 112 (designated Avatar) represents an avatar corresponding to a real person (e.g., the user) or a virtual person in the world. Object 114 (designated Room) and object 116 (designated Portal) represent and define the topology of the world as locations (i.e. rooms) and passageways (i.e., portals) between the rooms. Object 118 (designated Artifact) represents articles that are or may be manipulated by any of users via their avatars. It will be appreciated, however, that this illustration does not limit the applicability of dynamic inheritance between objects to a virtual world environment and that dynamic inheritance of this invention can be used with objects for other representations, models, or schemes.

Figure 6:
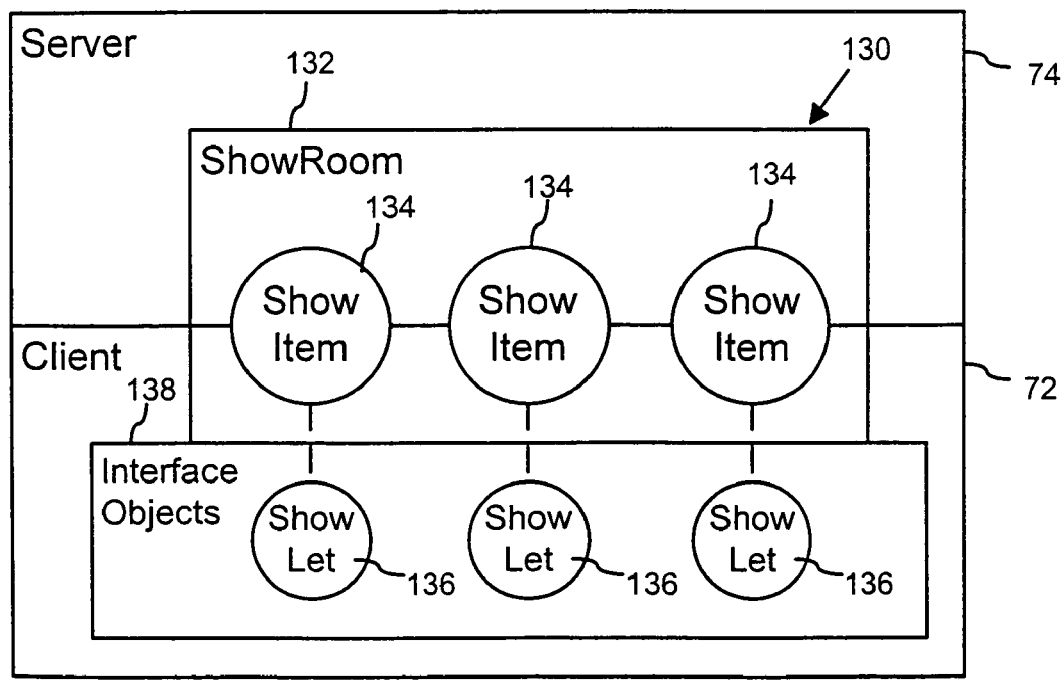
FIG. 6 is a schematic illustration of a presentation virtual world environment corresponding to a multi-user presentation system.

FIG. 6 is a schematic illustration of a presentation virtual world environment 130 having a multi-user virtual presentation room or ShowRoom object 132 in which presentation or information element objects 134, referred to as ShowItems, are presented from a server 74 to multiple viewers at multiple client computers 72 (only one shown). Each presentation object 132 occupies a separate Room object 114 in presentation VWE 130. Presentation room object 132 and presentation element objects 134 are global objects in that they are provided from server 74 to client computers 72 as part of presentation VWE 130. The presentation element objects 134 are provided from one or more presenting users, who each may also be at client computers 72.

As one example, presentation VWE 130 may be used to convey information from relatively few presenters to relatively many viewers, as in an educational or professional presentation. As another example, most or all of the users of presentation VWE 130 may be presenters who are collaborating on a particular project. The presentation information may include text, graphics, audio, video, etc., either alone or in combination, and server 74 will require different processing and memory capabilities according to the format of the presentation information. Information about each individual presenter and viewer is maintained in association with a corresponding avatar object 114.

Each client 72 includes interface objects 136, referred to as Showlets, that communicate with presentation element objects 134 to render corresponding information or presentation features at the viewer's client computer (e.g., displays, multimedia information, or other outputs) and to pass information from clients 72 to information objects 134. Interface objects 136 are included within an interface object space 138 that cooperates with, but is distinct from, presentation room object 132. For each active presentation element object 134 there is an interface object 136 (indicated by dashed lines), and the pair have mutual object references that tie them together.

Presentation element objects 134 are replicated across server 74 and all participating clients 72 and provide a model representing a presentation in presentation VWE 130. Interface objects 136 exist on each client 72 and provide a view of presentation VWE 130, with user interface and control elements, which view is separate from the model provided by presentation element objects 134. Separating the model and view represented by objects 132 and 134 from the user interface and controls provided by objects 136 allows a multi-user object oriented user domain such as presentation VWE 130 to be rendered easily and efficiently while also allowing information to be obtained from the multiple users. Moreover, interface objects 136 are a compact and versatile manner of distributing and implementing user interface and control functionality.

In one implementation, one Showlet interface object 136 corresponds to each ShowItem presentation element object 134 in a ShowRoom object 132 representing a presentation, thereby providing a one-to-one relationship between the respective view and model objects. The separation of the model and the view provides encapsulation of the interface implementation separate from the presentation element (i.e., functional) implementation and from other interface objects. This allows independent development of different interface items. It also allows different interfaces to be attached to the same presentation element at different times or for different viewers (e.g., "presenter" versus "viewer" or "audience"). And it allows different technologies to be used for functional and representational items (e.g., scripting or C++ for function, and DHTML for representation). It will be appreciated that in other implementations a one-to-plural relationship could exist between a ShowItem presentation element object 134 and plural Showlet interface objects 136 to provide different visualizations of a presentation element, or a plural-to-one relationship could provide a unified view of different presentation elements.

World database 80 maintains a complete and centralized representation of presentation room object 132 and presentation objects 134 within presentation VWE 130. Each presentation occurs in a presentation room object 132, which allows server 74 to limit the list of clients 72 that need updating for that presentation. Each client 72 associated with the presentation room object 132 maintains a local database 82 that includes a subset of the information contained in world database 80. Each local database 82 need only contain those objects that may potentially affect objects associated with that client 72. Portions of world database 84 maintained on server computer 74 are downloaded to each of multiple individual client computers 72 and are included in each of multiple corresponding local databases 82. As a presentation system, the same portions of world database 84 will typically be downloaded to each viewer client computer 72.

Interface objects 136 convey information (e.g., render a display) at each viewer client computer 72 according to the methods and properties of the presentation room object 132 and presentation objects 134 in the local database 82. In addition, interface objects 136 allow a viewer to manipulate presentation room object 132 and presentation objects 134 in the local database 82 to pass information from the viewer to server computer 74. Manipulation of or changes to objects in the local databases 82 are communicated to the world databases maintained on the server computer 74. Updates to the world database 84 due to changes at the client computers 72 are handled automatically and dynamically by server computer 74.

For example, a viewer can pose a question for the presenter, pass data, multimedia, or other files to the presenter, or reply to a query or a survey asked by the presenter through a presentation object 134. One or more interface objects 136 on the viewer's client computer 72 pass the question or reply to the presentation room object 132 or a presentation object 134 on the client computer 72, and server computer 74 updates world database 80 accordingly. With regard to a reply, for example, server computer 74 may accumulate replies from multiple viewers before distributing a corresponding modified object 132 or 134, either to the presenter, the viewers, or both. With regard to a question, for example, server computer 74 can distribute a corresponding modified object 132 or 134 to the presenter or one or more other viewers.

Figure 7:
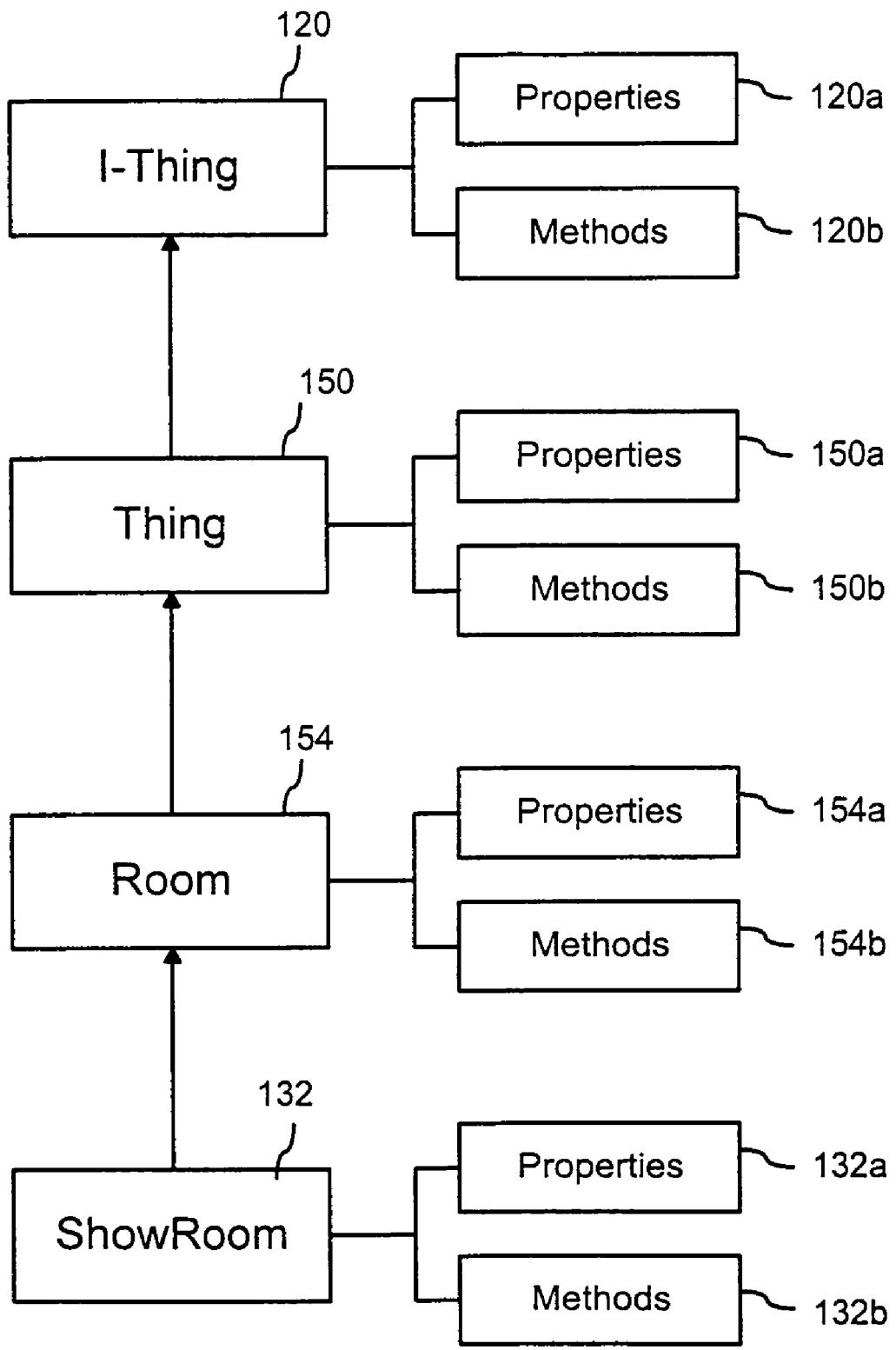
FIG. 7 is a block diagram illustrating a sequence of hierarchical inheritance relationships.

FIG. 7 is block diagram illustrating a sequence of hierarchical inheritance relationships between Thing object 150, exemplar Room object 154, and presentation room object 132 designated ShowRoom. Objects 150, 154, and 132 include the characteristics described with reference to objects 56 of object 50 which characteristics are represented as properties 150a, 154a, and 132a and methods 150b, 154b, and 132b, respectively. Thing object 150 is the root or parent exemplar of the set of objects and is the direct exemplar to Room object 152. Room object 152 is the direct exemplar to ShowRoom object 132, which represents a particular room in the virtual world environment.

Thing object 150 defines properties 150a and methods 150b shared by all other objects in the representation or virtual world environment, including exemplars 154 and 132. Properties 150*a* include for a particular object an exemplar property that refers to the exemplar or parent of the particular object, a name property that lists the name of the particular object, and a description property that includes a text description of the particular object.

In connection with the spatial VWE illustration of FIG. 4, for example, properties 150*a* may include a geometry property that associates a geometric model for representing the object, a location property that defines a location object in the virtual world environment with or in which the particular object is positioned, a contents property that lists objects "contained" by the particular object, and an owner property that identifies a user that the "owns" the particular object. Methods 150*b* may include a MoveTo method for changing the room the particular object is in and a Tell method by which one object passes information to another. Room object 154 defines additional properties 154*a* and methods 154*b* shared by lower level objects in the virtual world environment. Properties 154*a* may include for a particular object an exit property indicating an exit from the room and an entrance property indicating an entrance into the room. Methods 154*b* may include an announce method for broadcasting information to others in the room.

Properties and methods are associated with object interfaces during a design time phase when a developer creates them. The interfaces of objects defined under the component object model, for example, cannot be modified after the interfaces have been established, distributed, or promulgated. New functionality or other modifications typically are applied by adding a new interface at a design time phase. Interfaces are fixed or static during a run-time phase when the interfaces are used by or executed on behalf of a user.

It will be appreciated, however, that other methods particular to a virtual world environment could be included in methods 150*b* and that different applications could use entirely different methods. In connection with presentation VWE 130, properties 150*a* may relate more to accessing and providing presentation information than to geometric and location properties that are characteristic of a spatial VWE. ShowRoom object 132 is a lower level object of Room object 154 and defines properties 132*a* and methods 132*b* adapted for a presentation system.

ShowRoom object 132 is an exemplar for ShowRoom instances and inherits properties 154*a* and methods 154*b* from Room object 154. ShowRoom object 132 contains a presentation that can be an active, running presentation, one under construction, one ready to run or be copied, or one that has already been completed. The contents of a ShowRoom object 132 are the ShowItem objects 134 used in the presentation. ShowItem objects 134 can be used as present or potential presentation elements. ShowRoom object 132 includes the following properties 132*a* and methods 132*b*.

A ShowElements property lists the past and future ShowItem objects 134 of the presentation. The listing may be in the form of an IPropertyList that is a property inherited from Thing object 150. The IPropertyList is an ordered list of values (i.e., properties). A CurrentTopShowItem property contains the currently displayed ShowItem object 134. With the presentation displayed as multiple levels of a network site or page (e.g., an Internet or intranet page), the CurrentTopShowItem property contains the currently displayed ShowItem object 134 for a top level of the page. A CurrentElement property is an index into ShowElements of the last ShowItem displayed.

A CurrentRoleMap property lists the current role that an Avatar is filling in this presentation. The map key is the Avatar's name, and the value is the current role for that Avatar. Roles may include "presenter" and "viewer", and may include other roles for other applications. If there is no entry for an Avatar in the map, the "viewer" role is assumed. The listing may be in the form of an IPropertyMap that is a property inherited from Thing object 150. The IPropertyMap is an unordered list of name-value pairs in which for a given name or "key" the corresponding object or value is returned.

An AuthorizedPresenters property lists the names of Avatars that can assume the role of presenter. The listing may be in the form of an IPropertyList. A CreateAndAddShowItem (showItemType) method of ShowRoom object 132 creates and adds a new ShowItem instance. A ShowItemType parameter is the type of ShowItem to create (i.e., the ShowItem sub-exemplar type). Examples of ShowItem types include Meter (a sliding meter that allows the audience to select a rating by moving a graphical slider), Chooser (a text question with a list of radio buttons and text answers for the audience to select from), QuestionQueue (a list of audience-generated questions), etc."

A CloneShowItem(showItem) method makes a copy of a ShowItem object 134 and moves it into this ShowRoom. A CloneShowRoom(showRoom) method makes a copy of an entire ShowRoom object 134. This includes calling a CloneShowItem method for each of the ShowItem objects 134 in the contents of original ShowRoom object 132. An InsertShowItemAt(showElementsIndex) method inserts a ShowItem object 134 in a presentation ShowItems list at the index specified. A NextElement( ) method increments a CurrentItem property, but not past the end of the list. If the next element is a top-level element (i.e., it replaces the entire page, as described below), the CurrentTopShowItem property is set to the new ShowItem object 134.

ShowItem object 134 is an exemplar for ShowItem instances, which are elements of a presentation. A ShowItem can be an entire new page (template), or an element within a page. Each feedback element, such as a question and answer form to be completed by a viewer, has a single ShowItem. Each presentation element also has a single ShowItem. For example, presentation elements may be an object or system for broadcasting live or on-demand audio, video, or multimedia components. An example of a format for such objects or systems is NetShow, a platform for streaming multimedia over networks available from Microsoft Corporation. ShowItems also can record the history of the presentation. For example, ShowItems can be used to replay a previously shown or designed presentation, to study the audience or viewer response to the presentation, and to provide log information for external processing.

Showlet interface objects 136 are compatible with and rendered by a graphics and multimedia-capable application such as a network browser (e.g., Internet Explorer from Microsoft Corporation) to display information to viewers and accept input from them. Showlet interface objects 136 may be written in any of a variety of languages including JAVA, Dynamic HTML (DHTML), Visual Basic, etc. For purposes of illustration, the following description is made with reference to Showlet interface objects 136 written in Dynamic HTML, but may be similarly applied to other programming or scripting languages.

Dynamic HTML is an extension of standard HTML introduced by Microsoft Corporation and specified in the Internet Client Software Development Kit (SDK) published by Microsoft Corporation. DHTML enables authors to dynamically change the rendering and content of a document by modifying the current document and automatically reformatting and redisplaying the document to show changes. It does not need to reload the document or load a new document, or require a distant server to generate new content. The HTML elements, attributes, and styles in DHTML are based on standard HTML and cascading style sheet (CSS) specifications.

Dynamic HTML includes an object model for providing interfaces that allow scripts and components to access DHTML features. Using the object model, HTML elements in a document are available as individual objects, and the elements and their attributes can be examined and modified by reading and setting properties and by calling methods. The object model also makes user actions, such as pressing a key and clicking the mouse, available as events.

Each presentation element (ShowItem) object 134 represents a different functional piece of a presentation, although a presentation object 132 might include several pieces of presentation data. For example, a SlideShow ShowItem might include several slides. Within the context of Showlet interface objects 136, ShowItem objects 134 include the following properties and methods. A ShowletID property of each ShowItem object 134 is a DHTML identifier that indicates where to display in a DHTML page (i.e., for a viewer) the Showlet interface object 136 corresponding to the ShowItem object 134. The ShowletID property for each interface object 136 on a DHTML page is unique, even if several Showlet objects are nested hierarchically on the page.

A ShowletMap property of each ShowItem object 134 includes a key of a role (e.g., presenter or viewer) and a value of the name or other identifier of the Showlet interface object 136 to be used for users filling that role. The ShowletMap property maps from a role to a Showlet name. Each Showlet interface object 136 has a unique Uniform Resource Locator (URL) for locating and accessing the object. The URL of the Showlet interface object 136 is found by looking up its name in a ShowletURLMap property, which maps from the Showlet name to its URL. A Showlets property lists by name all of the Showlets that can be used with the ShowItem. Any of the listed Showlets, but only these Showlets, can be added to the ShowletMap for a particular role to use. The ShowletMap, World.Global.ShowletURL-Map, and Showlets properties may each be an IProperty-Map.

When a given ShowItem object 134 is to be displayed, a URL for the user's role in the ShowRoom 132 (as given in the CurrentRoleMap property of the ShowRoom, the ShowletMap property of the ShowItem, and the ShowletURLMap property of World.Global) is placed in the location given by the ShowletID DHTML idenitifier. Showlet identifiers are added to the page primarily by previous ShowItems, which are sometimes referred to as template ShowItems.

One identifier is predefined as "TopShowlet" and is the entire initial DHTML page. Showlet identifiers that replace the "TopShowlet" identifier are special in that they replace all Showlets on the display page. This means that previously displayed ShowItems are no longer relevant to the current display. A SubShowItemMap property lists the ShowItems that are currently being displayed within the ShowItem (such as a presentation element within a layout). This is based on the DHTML identifier indicating where the element is displayed, and the value is the ShowItem being displayed there. The SubShowItemMap property indicates the current state of the presentation.

In one implementation, ShowItem itself is an abstract superclass. It is not directly instanced. Sub-exemplars are created for each type of presentation element in the presentation system. Each of these sub-exemplars includes a collection of properties that define the details of the element and inherits the properties and methods of the ShowItem object 134. Examples of these sub-examplars include Meter (a sliding meter that allows the audience to select a rating by moving a graphical slider), Chooser (a text question with a list of radio buttons and text answers for the audience to select from), QuestionQueue (a list of audience-generated questions), etc." The properties that define the details of the element might include, for example, the text of a question and the answers, or the range of values for a slider.

User responses from a Showlet corresponding to a ShowItem object are communicated to the ShowItem via sub-exemplar-specific, server-side method calls. The Showlet calls a server-side method on the ShowItem. That method updates the state of the ShowItem appropriately, and then causes UpdateShowItem to be called on all client Showlets. The Showlet then updates its display to reflect the new state. This allows the ShowItem to decide what, if any, of the data communicated to it from the client should be redistributed to the other clients, either directly or in digested or collated form.

While ShowItem properties are being updated, a property UpdatingShowItem is set to true to prevent Showlets from accessing potentially inconsistent sets of properties. When UpdatingShowItem is set to false again, an OnUpdatingShowItemChanged method on the ShowItem object 134 calls an UpdateShowItem method on the corresponding Showlet. In another implementation a pair of method calls StartUpdate and EndUpdate are used rather than directly setting the UpdatingShowItem property. The Showlet then renders the updated ShowItem properties for the viewer.

A ResponseHistory property of ShowItem is an IPropertyList that includes all of the viewer responses to the ShowItem, with date/time stamps. For each response, there are several entries in the list. A first entry is the date/time stamp. A second entry is the name of the Avatar that responded. A third entry is the name of the ShowItem method that was called to communicate the response. A fourth entry is a parameter count indicating how many parameters there are. Following these entries may be an arbitrary number of items that are used as parameters to the method call.

Viewer Operation

When new users log onto the presentation system, they are presented with a list of available ShowRooms, each of which represents one presentation. The list is taken from a World.Global.OpenShowRooms property, which as an IPropertyMap includes the room name as the key and the ShowRoom as the value. Each user selects and enters one of the listed rooms (i.e., ShowRooms). Users may subsequently choose to move to different ShowRooms.

In one implementation, each user has one and only one role in a given ShowRoom. The role can be "presenter" or "viewer" and may be listed according to the avatar name for the user in the CurrentRoleMap property. If the name for a user's avatar is not found in the CurrentRoleMap property, the user is assigned a defaults role of "viewer".

When a user enters a ShowRoom, the system activates or initiates a top level Showlet as directed by the CurrentTopShowItem property. This Showlet, in turn, activates sub-ShowItems according to the SubShowItemMap property. Activating a ShowItem involves finding a URL for a corresponding Showlet. The ShowletMap property translates from the user's role to a Showlet name. The World.Global.ShowletURLMap property translates from the Showlet name to a URL for the Showlet. The resulting URL is incorporated into a DHTML element indicated by the ShowletID property. As a result, a Showlet is created for each active ShowItem and the user is shown all the active ShowItems.

The Showlet updates its display to match the current state of the presentation for the corresponding ShowItem and response properties. However, the Showlet first checks the UpdatingShowItem property to confirm that those properties are consistent. If the are inconsistent, the Showlet is not updated, but an UpdateShowItem call soon be made to cause the appropriate update.

A presenter can add a new ShowItem to the ShowRoom or advance the presentation to the next ShowItem in the ShowElements list. The presenter can also edit a ShowItem and control it. Editing and control are specific to the ShowItem sub-exemplar being shown. When a new ShowItem is displayed, it will often displace one that previously had the same DHTML identifier.

When a user responds to a ShowItem, its Showlet calls a server-side method on the ShowItem that may digest the response and set a variety of properties. When done, UpdateShowItem methods on each of the client Showlets updates the display as seen by the users. The ShowItem also stores the response in the ResponseHistory property, together with the time and the name of the user. Sometimes, the digested responses are not immediately redistributed to the clients. Instead, they are stored until the presenter has the system distribute them.

Presenter Operation

A ShowRoom can be used to create a new presentation on-the-fly or the presentation can be prepared ahead of time by the presenter with a list of ready-made ShowItems. Presentations that are given multiple times can be created, and the ShowRoom for the presentation cloned each time a new instance of the presentation is needed. ShowRooms and ShowItems are cloned and edited to create and modify presentations. This cloning and editing can be performed beforehand or during the course of the presentation. Avatars that have a ShowRoomCreator property set to true get additional controls on the room selection page, allowing them to create a new room by cloning an existing room. The list of cloneable ShowRooms is stored in the World.Global-.CloneableShowRooms propertymap, with the key being the room name and the value being the ShowRoom. A "blank" room exists in the list to create new presentations.

Once a new ShowRoom is created, any Avatar with the role "presenter" can create new ShowItems within that room, allow different ShowItems to be rendered, or edit existing ShowItems. Changes by the presenter cause the Showlets to update as well. The room creator is automatically set as a presenter in the room, and any presenter can make other users presenters as well. ShowItems are created by cloning existing ShowItems in the same room. Each room has "blank" instances of each type of available ShowItem. This does not create excessive system overhead because there are relatively few ShowItem types (e.g., about one dozen), and unmodified versions are relatively small. Most of the information is contained in the exemplar. As a result, having blank copies of each type of ShowItem is not excessively expensive. As one alternative, a global prototype list that lists the exemplars that could be used to create new items. As another alternative, a wizard-based approach could be used.

ShowItems can be created in various stages of readiness, and then completed and cloned at presentation or preparation time. The default presenter view of the ShowItem allows the presenter to edit the text of the item, and to select the Showlet to be used for each role. Once a ShowRoom presentation is complete, the presenter can mark it as "open" can leave it unopen and clone it for each actual presentation to be given. ShowItems collect a complete history of the viewer's responses, allowing later replay or analysis of the presentation.

In one implementation, each Showlet interface object 136 is in the form of a scriptlet, which is a DHTML page that can be used as a control in any application that supports controls. Properties, methods, or events in the scriptlet are based upon scripts that may be written in common active scripting languages such as JavaScript, Visual Basic Scripting Edition (VBScript), or another language. The scripts rely on the scripting capabilities of DHTML, which gives a complete object model for elements on the scriptlet including use of the standard OBJECT tag that is used to insert and work with any other object on an html document. The use of and format of scriptlets is specified with Dynamic HTML in the Internet Client Software Development Kit (SDK) published by Microsoft Corporation.

Figure 8:
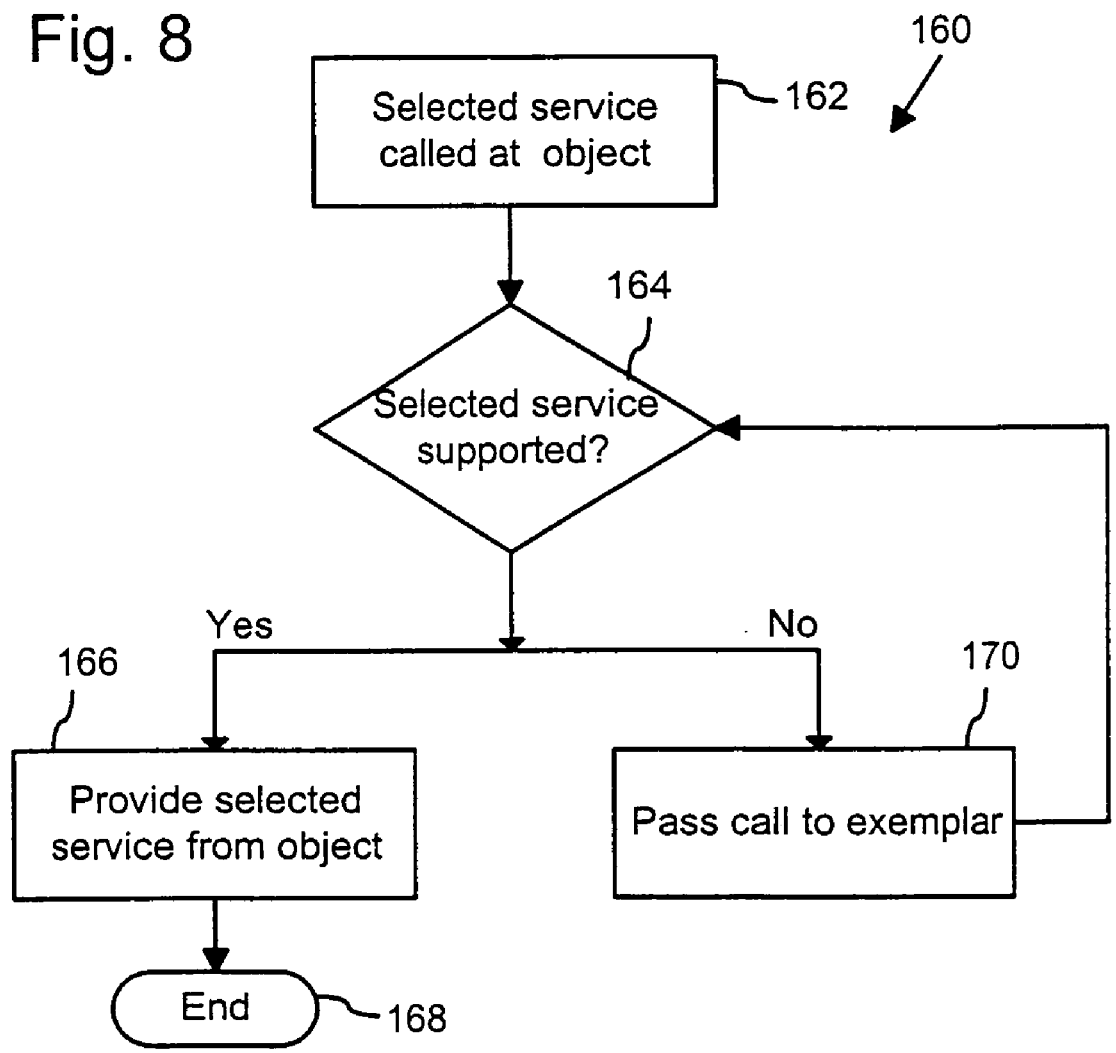
FIG. 8 is a flow diagram illustrating a hierarchical inheritance process.

FIG. 8 is a flow diagram illustrating a dynamic inheritance process 160 as a run-time use of objects. For purposes of illustration, dynamic inheritance process 160 is described with reference to the sequence of hierarchical inheritance relationships shown in FIG. 7.

Process block 162 indicates that a reference or call is made to a selected service (e.g., a property or a method) at a selected object (e.g., object 132), thereby making the selected object the current object. The reference or call may be made in the conventional manner that properties and methods of an object are referred to or called.

Query block 164 represents a query as to whether the current object receiving the reference or call (e.g., object 132) supports the selected property or method. Whenever the current object (e.g., object 132) supports the selected property or method, query block proceeds to process block 166. Otherwise, query block 164 proceeds to process block 170.

Process block 166 indicates that the selected property or method is provided by the current object. Process block 166 proceeds to termination block 168.

Process block 170 indicates that the reference or call to the selected property or method is passed to the direct exemplar of the current object (e.g., object 114) and the direct exemplar is redesignated the current object. Process block 170 returns to query block 164.

Process 160 provides a mechanism for dispatching properties and methods to exemplars. Process 160 supports dynamic inheritance of other properties and methods at run-time by allowing intervening exemplars to be added to a hierarchy of objects.

With reference to FIG. 5, in one implementation I-Thing interface 120 also defines, supports, or implements methods 120b that include the dynamic inheritance methods set forth in Table 1. Methods 120b in Table 1 are available to each object of which I-Thing interface 120 is the root exemplar (e.g., objects 110–118 and 132).

TABLE 1

| Name | Action |
| --- | --- |
| AddMethod | Adds a designated method to make the method available to the object |
| RemoveMethod | Removes a designated method to make the method unavailable to the object |
| AddProperty | Adds a designated property to make the property available from the object |

TABLE 1-continued

| Name | Action |
| --- | --- |
| RemoveProperty | Removes a designated property to make the property unavailable from the object |
| GetMethod | Returns a designated method including the number and types of the method parameters |
| GetProperty | Returns a designated method including the number and types of the property parameters |
| PutMethod | Puts a designated value or designated values in the parameters of a designated method |
| PutProperty | Puts a designated value or designated values in the parameters of a designated property |
| InvokeMethod | Invokes a designated method |

For example, methods and properties available for implementation or access by the dynamic inheritance methods of I-Thing interface 120 are in a dynamic inheritance listing, such as a table, that indicates the names of the methods and properties, defines the services they provide, and includes unique identifiers for them. The unique identifiers may be of the form of integer values like the dispatch identifiers (DISPIDS) used with the dispatch interface of the IDispatch interface used in COM automation.

The AddMethod and the AddProperty methods allow methods and properties, respectively, to be added to the dynamic inheritance listing so that the listing may be modified during run-time. These methods pass the name and a definition of the method or property to be added to the dynamic inheritance table and assign a corresponding unique identifier for the method or property. The RemoveMethod and the RemoveProperty methods remove methods and properties from the dynamic inheritance listing. The InvokeMethod method allows a user to execute the designated method. The GetMethod and the GetProperty methods return the designated method and property, respectively, from the dynamic inheritance listing. The PutMethod and the PutProperty methods allow a user to set the method or property.

The dynamic inheritance methods of Table 1, as well as the dynamic inheritance process 160 of FIG. 8, allow methods and properties to be dynamically added to or changed within otherwise conventional static interfaces. The adding of the methods and properties includes accessing information about the methods and properties, setting values in and retrieving values from them, and invoking the methods. Methods and properties may be added in effect by accessing them from an exemplar to a particular interface or object according to dynamic inheritance process 160. In addition, methods and properties may be added by adding them to the set of methods and properties available at an exemplar, such as the root exemplar I-Thing.

These features allow inheritance to be dynamic and provide a seamless scripting environment in programmable applications like virtual world environments. Moreover, the dynamic inheritance methods of Table 1 and dynamic inheritance process 160 of FIG. 8 may be used together as described hereinabove, or either may be used alone to provide dynamic inheritance functionality.

The dynamic inheritance method InvokeMethod is similar to the Invoke method of the IDispatch interface used in COM automation. The IDispatch::Invoke method allows a software client to invoke a designated software method available from another application. The methods available from the other application are specified in a dispatch interface (often called a dispinterface). Dispatch identifiers (DISPIDs) identify the available methods. The similarity between the dynamic inheritance of this invention and the IDispatch interface used in COM automation extends no farther.

The dynamic inheritance of this invention allows methods and properties to be added to or removed from the set of available methods and properties. In contrast, IDispatch interface used in COM automation is a conventional COM interface and is immutable once it has been established. Methods and properties are not added to an IDispatch interface after it has been established. It will be appreciated, therefore, that changing the methods and properties available to an interface like the I-Thing interface 120 after it has been established is a major improvement upon the prior functionality of objects with fixed interfaces (e.g., COM objects) like the IDispatch interface.

Figure 9:
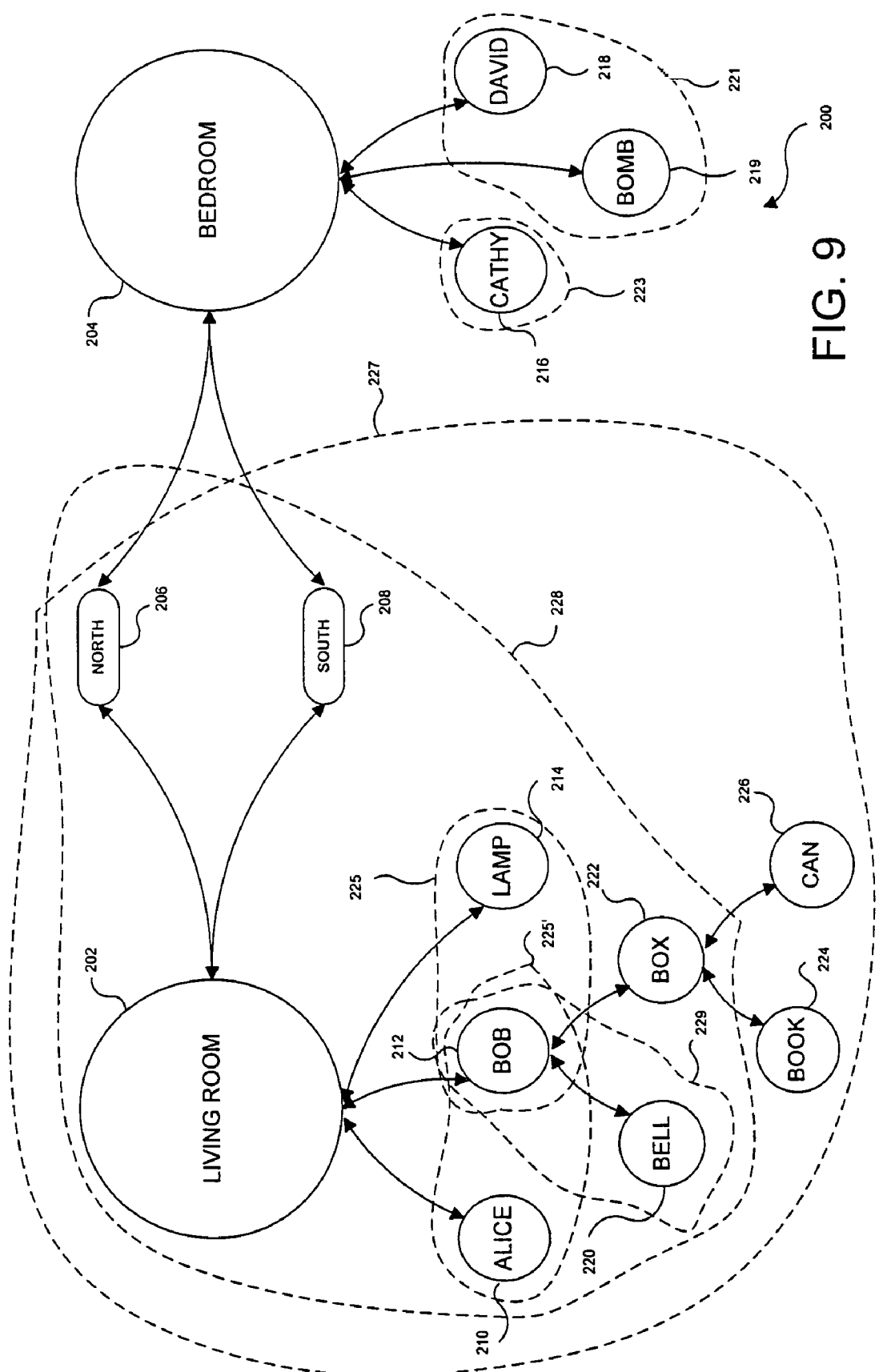
FIG. 9 is an exemplary view of a virtual world environment (VWE) illustrating one example of the divisions within the virtual world by rooms, perception regions, and bystander regions.

FIG. 9 is a block diagram illustrating an exemplary VWE 200. A living room 202 and a bedroom 204 are linked together by a north portal 206 and a south portal 208. These portals are associated with living room 202 and bedroom 204, so that an object entering a portal in a room will automatically be moved into the other room on the other side of the portal. Further, north portal 206 and south portal 208 are simultaneously contained in living room 202 and bedroom 204. Bedroom 204 contains a Cathy avatar 216, a bomb artifact 219, and a David avatar 218. Also, living room 202 includes other objects such as a lamp artifact 214, a bug artifact 223 (i.e., a microphone listening device), an Alice avatar 210, and a Bob avatar 212. Additionally, Bob avatar 212 is associated with a pair of artifacts, including a bell 220 and a box 222, which has the property of a closed container. Further, box 222 is associated with another pair of artifacts, specifically, a book 224 and a can 226.

A bystander region 228 is shown enveloping living room 202, Alice avatar 210, lamp 214, Bob avatar 212, north portal 206, south portal 208, bell 220, bug artifact 223, and box 222. Since box 222 is "closed" so that book 224 and can 226 contained within box 222 are not presently perceivable by Bob avatar 212, box 222 contains objects that may not affect Bob avatar 212. A change in an object that occurs within bystander region 228 may only be potentially "sensed" by client objects disposed therein, and the change can not be sensed by objects disposed outside the bystander region, such as book 224 and can 226. Thus, a local database update, which is explained in greater detail below, is only provided to each of those client computers 72 of users associated with objects, such as avatars, that may potentially "sense" the change and are disposed within the bystander region of the changed object.

The ability of an object to sense the changes in other objects that produce various types of data may depend upon the disposition of the sensing object in the VWE. For example, light produced by a lamp artifact may be sensed at a greater distance by an avatar disposed in a virtual open field than a sound produced by a bell artifact. Conversely, the sound may be more readily sensed by the avatar when it is positioned within a virtual structure that obstructs the light. Thus, separate boundaries for the perception region of the avatar may exist for various types of data produced by an object.

An exemplary auditory perception region extent 229 depicted in FIG. 9 contains an object (bell 220) that will be "heard" by Bob avatar 212 when the bell rings. A visual perception region extent 225 contains lamp 214, which is "seen" by Bob avatar 212 when Bob is oriented or facing towards the lamp. However, if the disposition of Bob avatar 212 changes so that Bob is oriented towards Alice avatar 210 and thus facing away from lamp 214, the perception region boundaries for Bob may change.

In this case, Bob avatar 212 may continue to sense the ringing of bell 220 (because auditory perception region extent 229 has not changed), but Bob may no longer be able to visually sense lamp 214. A new visual perception region extent 225' then applies. Although not shown, it is understood that another change in the location of Bob avatar 212 may enable Bob to visually perceive Alice avatar 210 and lamp 214, but be unable to sense the ringing of bell 220. Bell 220 would then be disposed outside the of the auditory perception region extent for Bob avatar 212 at the new location.

Also, it is further envisioned that yet another perception region extent would be provided for sensing force feedback effects (haptic feedback data) relative to objects disposed within the bystander region of objects. For example, an extent for force feedback perception region 221 is shown for David avatar 218 that includes bomb 219. Since the bomb is within the force feedback perception region of David avatar 218, the client (user) associated with the David avatar would be able to sense when bomb 219 explodes, e.g., if the user were manipulating a joystick to cause David avatar 218 to walk toward the exploding bomb, the force of the explosion would be experienced as a backward thrust on the joystick handle.

Force feedback output devices can provide a plurality of different types of tactile sensations (effects) that would simulate the percussive effects of an explosion. Also, a gradient for a force feedback perception region 221 may be provided to vary the intensity of the force feedback effects in relation to the distance between bomb 219 and other objects disposed in bedroom 204. Similarly, gradients may be provided for the visual and auditory perception regions associated with an object. It is important to note that bomb 219 is not within the force feedback perception region of Cathy avatar 216 and accordingly, the user associated with the Cathy avatar will not sense the force feedback effects associated with bomb 219. However, if the location of Cathy avatar 216 within bedroom 204 changes, the user associated with the Cathy avatar may be enabled to sense the effects of the explosion if the location of the bomb is within the force feedback perception region extent of the Cathy avatar at the new location of the avatar.

Further, the present invention enables a perception region associated with an object to have an extent that includes multiple objects disposed in multiple rooms. For example, FIG. 9 illustrates an auditory perception region 227 that is associated with Cathy avatar 216. The extent of auditory perception region 227 includes substantially all of the objects disposed within both living room 202 and bedroom 204, except for book 224 and can 226, which are positioned inside closed box 222. Further, Cathy avatar 216 is in communication with bug artifact 223, which enables Cathy avatar 216 to sense auditory data produced within living room 202 from a location inside bedroom 204.

If Cathy avatar 216 were not in communication with bug artifact 223, another auditory perception region 227' would be associated with Cathy avatar 216. The extent of auditory perception region 227' only includes objects disposed within bedroom 204. Similarly, David avatar 218 is in communication with bug artifact 223, which enables David avatar 218 to sense sounds produced inside living room 202 from a position within bedroom 204. Also, auditory perception region 227 is associated with David avatar 218 when bug artifact 223 is in communication with David avatar 218. Further, other auditory perception region 227' would be associated with David avatar 218 when bug artifact 223 is not in communication with David avatar 218.

Although bug artifact 223 is shown increasing the extent of a static (non-moving) auditory perception region associated with an avatar, it is also envisioned that a dynamic (moving) perception region could be provided for various data types. For example, a mobile object that could sense at least one type of data could be commanded to travel to various locations within the VWE and communicate data sensed at the locations to an avatar. Thus, the immediate disposition of the mobile object could dynamically change the perception region extent associated with the avatar for the type of sensed data provided by the mobile object.

Figure 10:
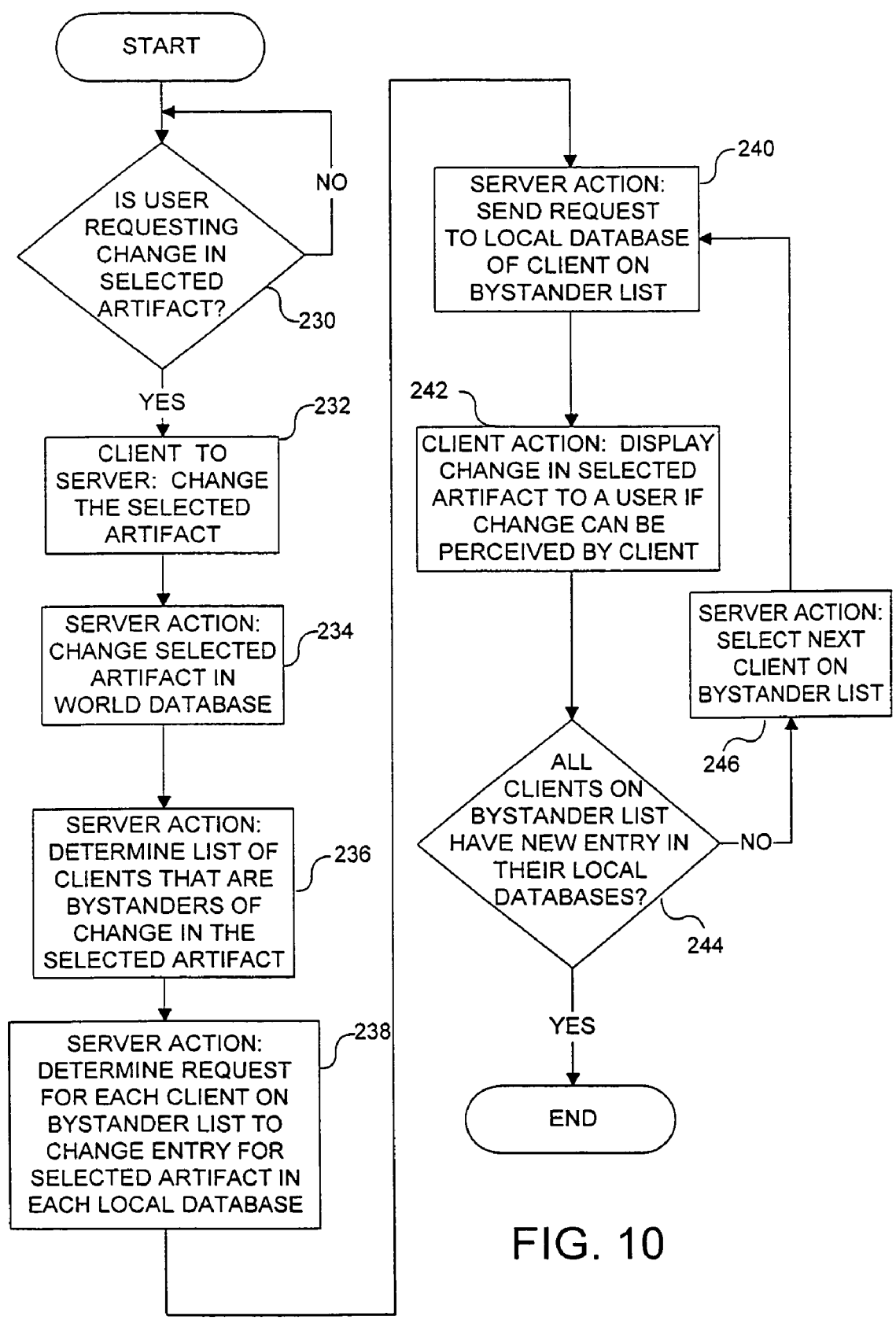
FIG. 10 is a flow chart providing an overview of the logic for updating a client's local database when a change occurs.

FIG. 10 is a flow chart illustrating the steps for updating a property of a selected artifact that has changed. Beginning with a start block, the logic flow advances to a decision block 230 and awaits a command by a user to change a property of a selected artifact. Once such a command is detected, the logic shifts to a block 232 in which the client requests that the server change a property of the selected artifact. The logic then advances to a block 234, which provides that the server change the property of the selected artifact in the world database. The world database contains all of the information required to represent all of the objects in the VWE.

After updating the world database, the logic flows to a block 236 in which the server determines a list of client computers of users that are bystanders of the change in the property of the selected artifact. In this example, the location property has not changed and the bystander clients are associated with objects that are avatars, which may at least be potentially affected by the change. Once the list of bystanders is determined, the logic moves to a block 238; this block indicates that the server makes requests to change at least one entry in each client's local database. The requests specify the change in the property of the selected artifact for each client on the list of bystanders.

After the requests are made, the logic advances to a block 240, and the server sends the request to change the local database entry to a client on the list of bystanders. The logic flow now moves to the client in a block 242. If the change in the property of the selected artifact is within the perception region of the avatar associated with the client that has received the request, the change will be displayed and/or produced by the client for its user.

The flow of logic continues with a decision block 244 that determines whether each of the clients on the list of bystanders has received a request to change the entry in their respective local databases. If so, the logic advances to an end block, and the updating of local databases is complete. However, if any bystanders (i.e., clients on the list of bystanders) remain that have not received a request, the logic moves to a block 246 and the server selects the next client on the list of bystanders. Once the next client is selected, the logic loops back through blocks 240, 242, and 244; the looping continues until all clients on the list of bystanders have received their requests. After the last client on the list of bystanders has received a request, the logic advances from block 244 to the end block.

Figure 11:
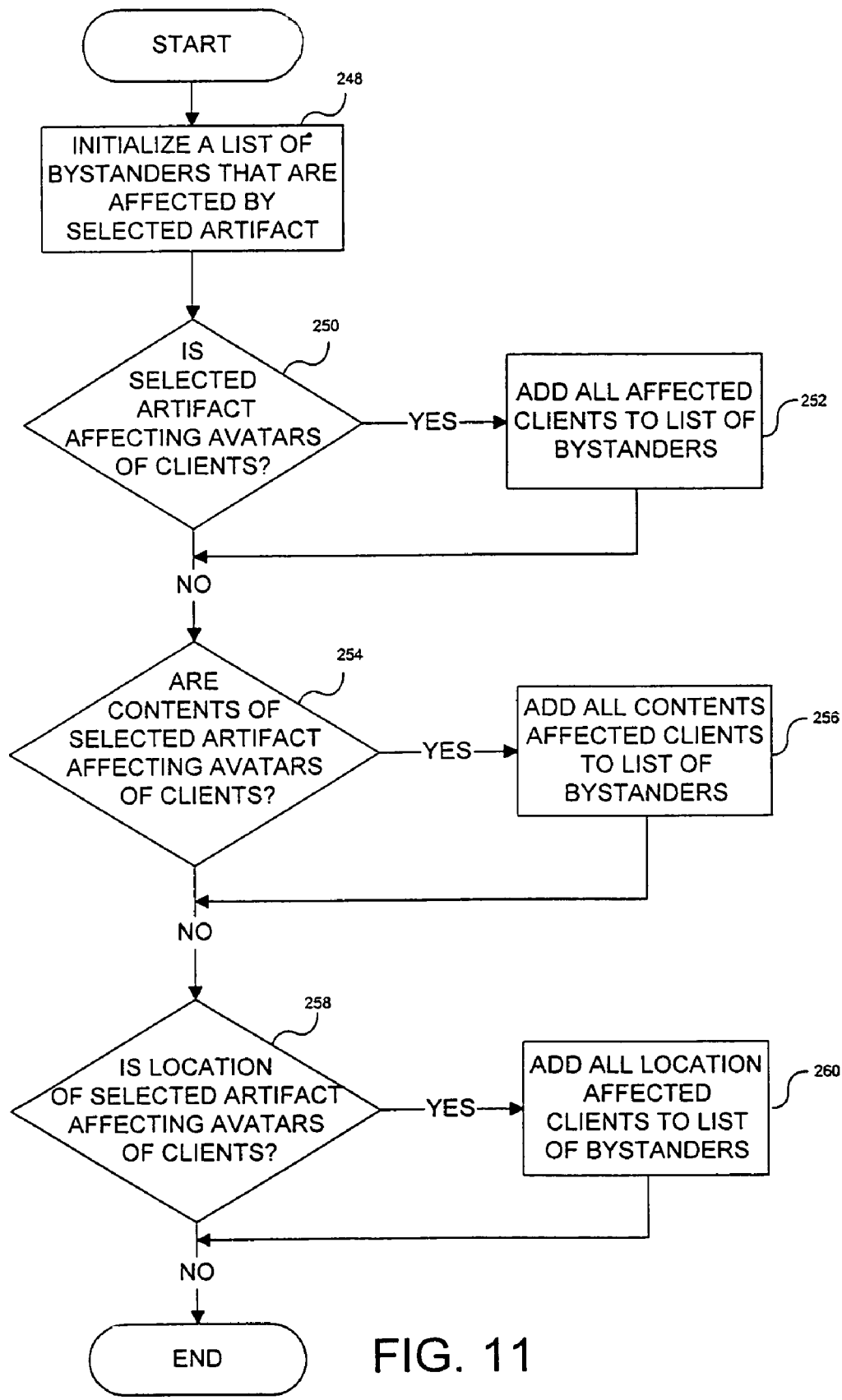
FIG. 11 is a flow chart showing the steps for determining the clients that are bystanders of a changed object.

The details of determining the client on the list of bystanders in block 236 of FIG. 10 are illustrated by the flow chart shown in FIG. 11. Moving from a start block to a block 248, the logic initializes a list for containing clients associated with avatars that are potentially or actually affected by a change to a property of the selected artifact. After initialization, the logic advances to a decision block 250, and a determination is made as to whether the change to the artifact affects the avatars of any clients, i.e., whether the change occurs within the perception region extent of the avatar associated with the client. For example, a selected artifact that is wielded as a weapon by an avatar against another avatar would be considered to actually affect the other avatar. If the determination in decision block 250 is positive, the logic steps to a block 252, and all clients actually affected by the change in the property of the artifact are added to the list of bystanders.

If the determination in block 250 is negative, or if block 252 is completed, the logic moves to a decision block 254, and a determination is made as to whether the contents of the artifact potentially or actually affect any client avatars. Interestingly, the contents of the selected artifact will not immediately affect any avatars unless the selected artifact represents a container that has the property of an open container, so that its contents are exposed. If the test in decision block 254 is true, the logic flows to a block 256, and all clients that are potentially or actually affected by the contents of the artifact are added to the list of bystanders. If the result in decision block 254 is false or if block 256 is already completed, the logic steps to a decision block 258.

In block 258, the logic determines if the location of the artifact potentially affects the avatars of any clients. If so, the logic proceeds to a block 260; and all clients that are potentially affected by the location of the selected artifact are added to the list of bystanders. However, if not, or if block 260 is already completed, then the logic advances to an end block, and the list of bystanders for changes in a selected artifact is complete.

Figure 12:
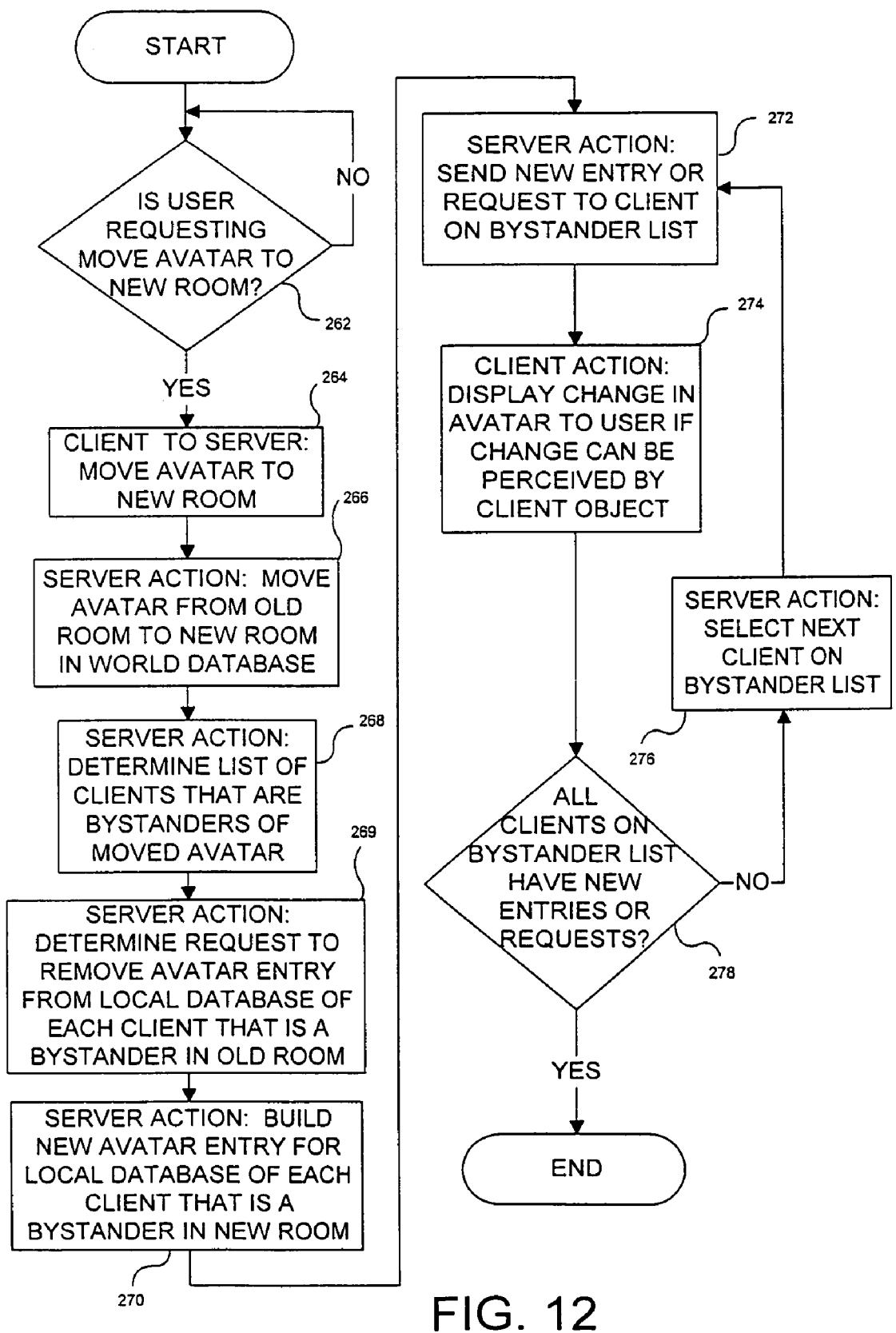
FIGS. 12, 13, and 14 are flow charts showing the steps for selectively updating a client's local database when an avatar moves from one room to another room.

In FIG. 12, a flow chart illustrating the logic implemented to move an object from one room to another room. In this example, the moving object is an avatar that is associated with a client (user). However, substantially the same steps may be applied to move another type of object from one room to another room.

From a start block, the logic advances to a block 262 and waits for an instruction by the user to move an avatar to a new room, to be detected. Upon detection of the instruction, the logic advances to a block 264 in which the client sends a request to the server to move the avatar from one room to another room. After making the request, the logic flows to a block 266, where the server responds to the request to move the avatar to the new room by updating the virtual world database to reflect the change in the location of the avatar. Once the world database has been updated, the logic steps to a block 268 in which the server determines a list of clients that are bystanders of the moving avatar.

The logic flows to a block 269 and the server makes a request of those clients on the bystander list that are not bystanders in the new room for the moved avatar. The request instructs these clients to remove the entries for the moving avatar from their local databases. The logic steps to a block 270 and the server builds new local database entries for each object that is a bystander of the moved avatar in the new room. After the entries are built, the logic moves to a block 271, and the server sends new local database entries to the client of the moved avatar for each object that is a bystander of the moved avatar in the new room.

Next, the logic advances to a block 272 in which the server builds new entries for the local databases of every client on the list of bystanders that are bystanders in the new room for the moved avatar. Once the new entries are added, the logic flows to a block 273, and the server sends either a new entry to a local database of a client on the list that is a bystander in the new room, or else a request to a client on the list that is a bystander in the old room. After sending the new entry or request, the logic advances to a block 274, which indicates that the client will display the change in the location of the moved avatar to the user if the moving avatar is within a perception region extent of another object associated with the client, such as another avatar.

Next, the logic moves to a decision block 278 to determine if all of the clients on the list of bystanders have received a new entry or request. If not, the logic proceeds to a block 276 in which the server selects the next client on the list of bystanders, and the logic loops back to implement the steps of blocks 272, 274, and 278 again. The looping through these steps continues until the test at decision block 278 is affirmative; then, the logic advances to an end block. Upon reaching the end block, all of the clients on the list that are bystanders of the avatar in the new room will have received new entries in their local databases to indicate the change in the location of the moved avatar. Also, all of the other clients on the list that were bystanders of the avatar in the old room, will have received requests to remove the avatar entry from their local databases.

Figure 13:
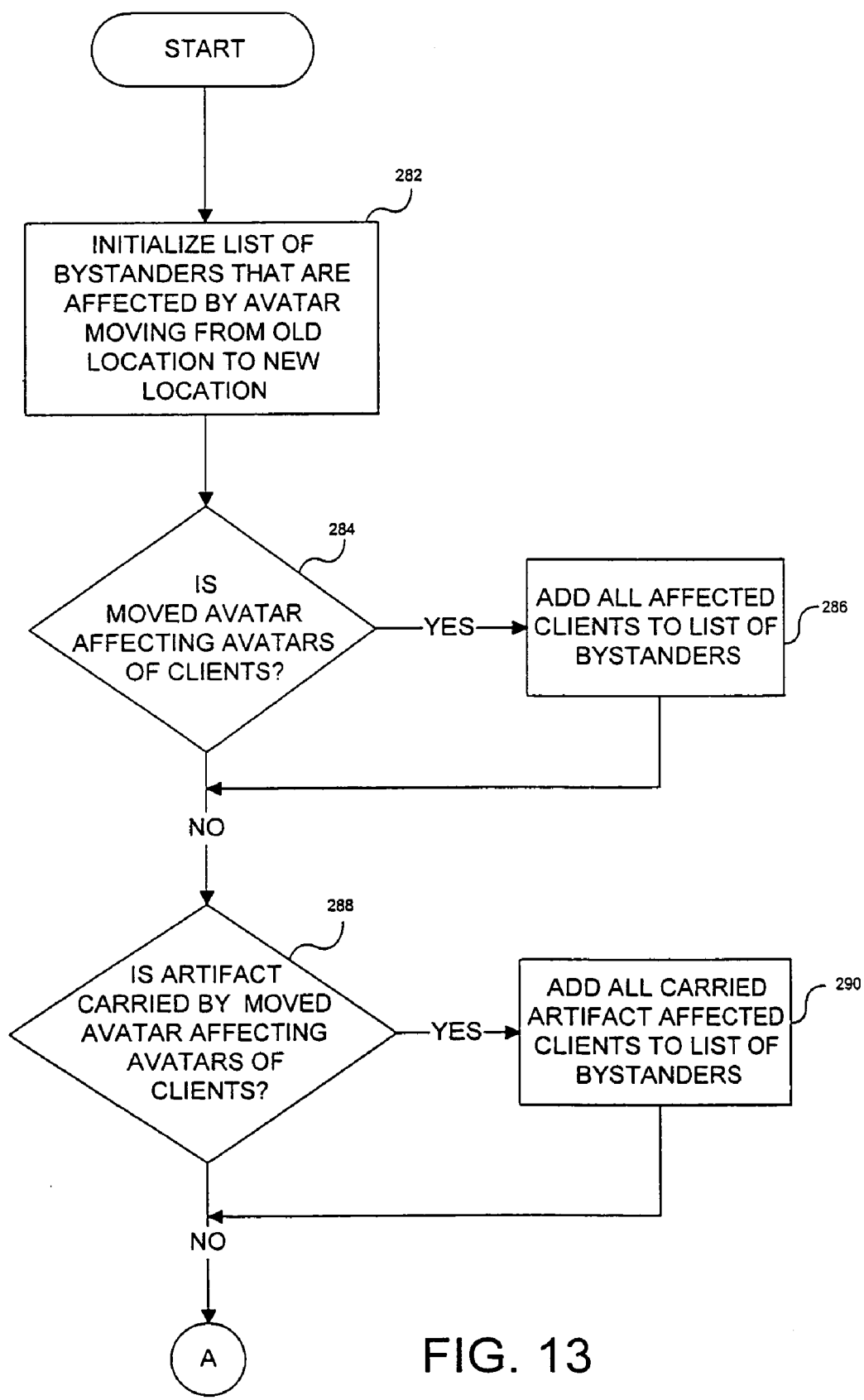
Figure 14:
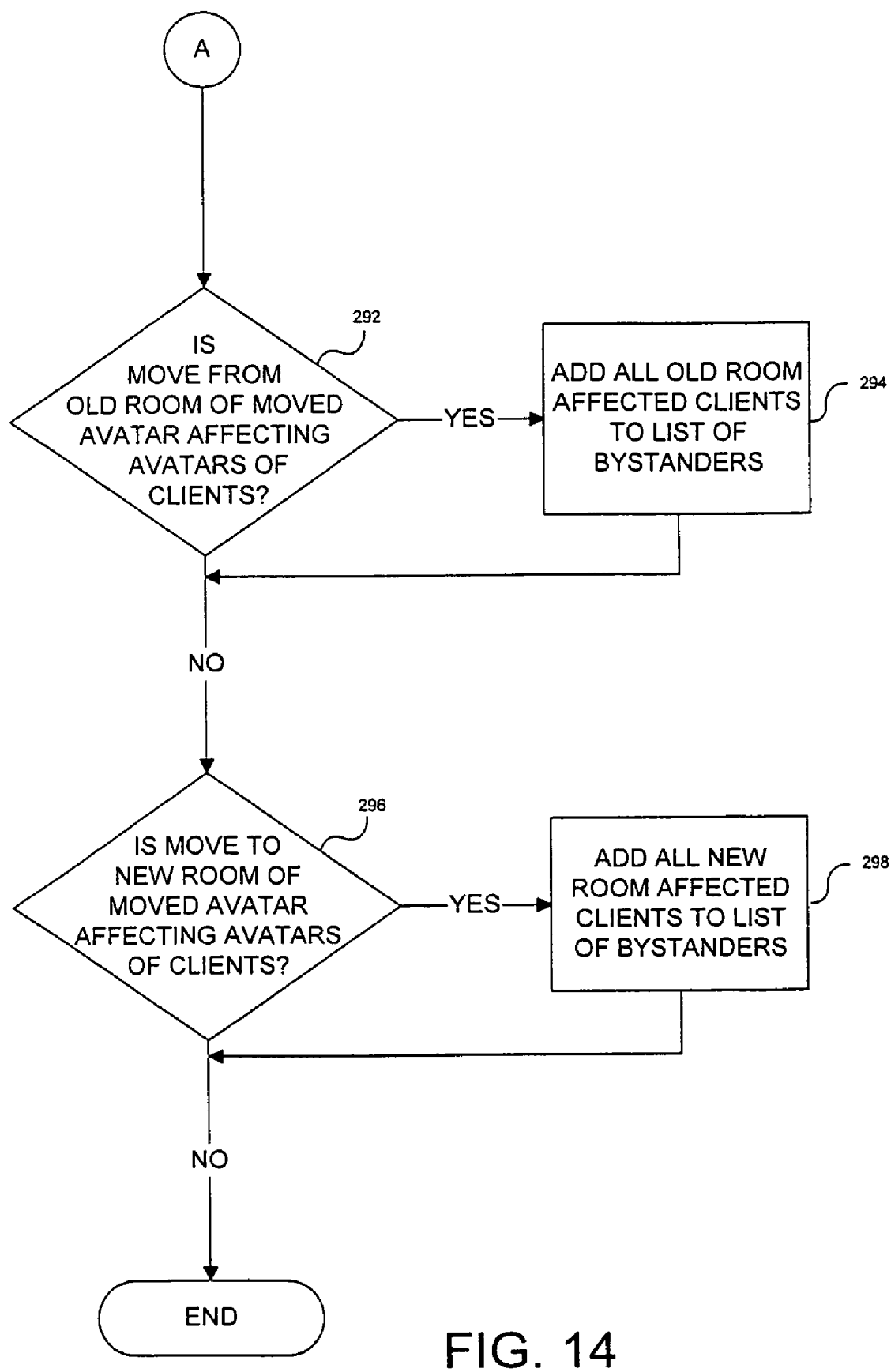

A more detailed description of the steps involved in determining the bystanders in block 268 of FIG. 12 is provided by the flow chart shown in FIGS. 13 and 14. From a start block, the logic advances to a block 282, initializing a list of clients that are potentially or actually affected by an avatar moving from one room to another room. After this initialization, the logic advances to a decision block 284 to determine if the moving avatar may affect the avatars of other clients, i.e., whether the moving avatar has entered into, or alternatively, out of the perception regions associated with the other clients' avatars.

If so, the logic steps to a block 286, and all potentially or actually affected clients are added to the list of bystanders. If not or if the logic flow has otherwise advanced to block 286, the logic proceeds to a decision block 288 to determine if an artifact carried by the moving avatar may affect any other client avatars. If so, the logic flows to a block 290, which provides that all clients potentially or actually affected by the artifact carried by the moving avatar are added to the list of bystanders. All artifacts wielded by the moving avatar are considered to be carried, and the determination at block 288 is performed accordingly.

If the result of decision block 288 is negative or if the logic has previously advanced to block 290, the logic advances to a decision block 292, which is shown in FIG. 14. In decision block 292, the logic determines whether the move by the avatar from the room previously occupied affects any other client avatars disposed in that room, i.e., prior to the move, determines whether the moving avatar was disposed in the bystander region of the other client avatars in the old room.

If so, the logic proceeds to a block 294 in which all clients that are potentially or actually affected by the avatar moving from the previously occupied room to the new room are added to the list of bystanders. These clients are also designated as bystanders in the old room for the moving avatar. A negative determination in block 292 or the completion of block 294 leads to a decision block 296, to determine if the move by the avatar to another room affects any other avatars disposed in the new room, i.e., to determine if the moving avatar is disposed in the bystander region of the other client avatars in the new room. If affirmative, the logic steps to a block 298 so that all clients for avatars in the new room that are potentially or actually affected by the move to the new room are added to the list of bystanders. Further, these clients are designated as bystanders in the new room for the moving avatar. However, if the determination is negative or if block 296 has been completed, the logic continues to an end block and returns to the main logic flow shown in FIG. 12.

Figure 15:
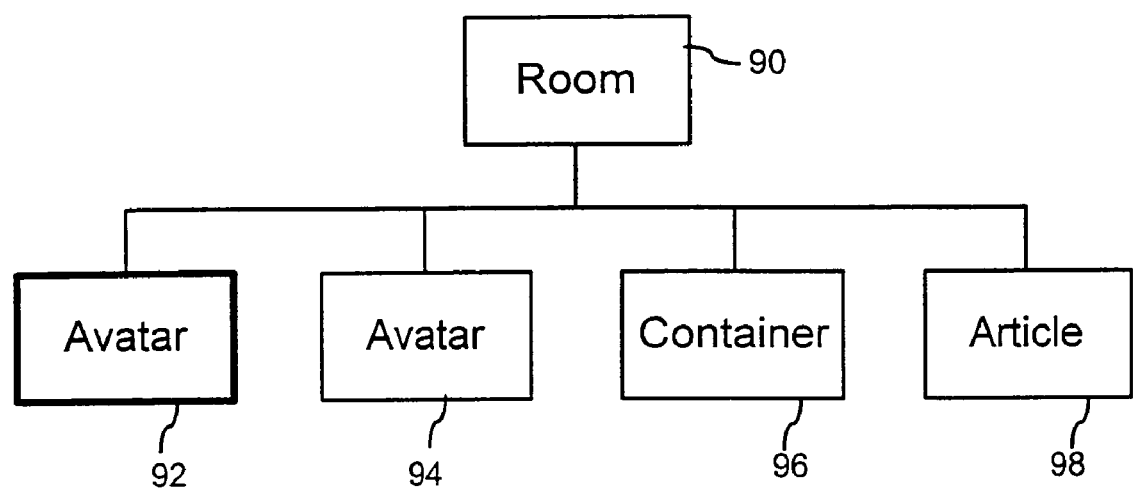
FIG. 15 is a block diagram illustrating associational relationships between entities within the virtual world environment.

FIG. 15 is a block diagram illustrating associational relationships between the virtual space or room 90 and entities 92–98 of FIG. 4. The associational relationships primarily represent the physical or corporeal distinctions between entities and order them according to the associations Self, Contents, Peer, or Container. Each of entities 92–98 is its own Self relative to and separate from other entities. Avatar 92 is shown with highlighting to illustrate its Self association, as explained below with reference to FIG. 16. Room 90 has entities 92–98 as its contents and hence has a Contents association. Avatars 92 and 94 and article 98 are Peers of each other within room 90. While entity 96 is also a peer of the other entities, it is assigned to an associational category Container because it contains one or more other entities (not shown) despite not being an area or room.

FIG. 16 is a flow diagram illustrating a latebound event mechanism process 320 in which event notification methods are promulgated among objects corresponding to entities 90–98 in a latebound, dynamic, run-time manner. For purposes of illustration, dynamic event mechanism process 320 is described with reference to the associational relationships shown in FIG. 15 and the hierarchical relationships shown in FIG. 5.

Process block 322 indicates that the entities and their corresponding objects within the virtual world environment are assigned associational relationships such as those shown in FIG. 15. It will be appreciated that these relationships are illustrative and that the present invention may be applied to other associational relationships and to applications other than a virtual world environment.

Process block 324 indicates that an event occurs or is "fired" with regard to one of the entities within the space in the virtual world environment. In one implementation, a FireEvent method invoked at object 312 corresponding to avatar 92 to initiate the event. The FireEvent method passes the name of the event and any required parameters. With reference to the illustration in FIGS. 4 and 14, for example, the event occurs with reference to avatar 92 and is a Tell event in which avatar 92 passes information or tells something to other entities in room 90. The FireEvent method may be executed either directly through the object (e.g., object 312) as a conventional defined object method or may be executed indirectly through a dynamic inheritance process described below in greater detail.

Process block 326 indicates that an event notification method (e.g., OnContainerFoo) is called at any object within any container entity that is within the virtual world space. In this example, the OnContainerTell method is called on objects (not shown) within object 318 corresponding to container 96. The OnContainerTell method may be executed either directly through the contained objects as a conventional defined object method or may be executed indirectly through the dynamic inheritance process described below.

If it is supported directly or indirectly, the OnContainerTell method or any other OnContainerFoo method provides a functional result at any object contained within a container entity (e.g., 96). Execution of any OnContainerFoo method prior to other event notification methods is desireable because of the potential otherwise for OnContainerFoo methods to have unpredictable results on entities contained within a Container entity. In this regard, objects within container entity 96 receive early notification in recognition of their unique association with respect to container entity 96.

Process block 328 indicates that an event notification method (e.g., OnContentFoo) is called at any object within the object of any space entity within which the event is fired. In this example, the OnContentTell method is called on objects corresponding to entities 92–98 the are the contents of object 314 corresponding to room 90.

The OnContentTell method may be executed either directly through the contents objects within object 314 as a conventional defined object methods or may be executed indirectly through the dynamic inheritance process described below. If it is supported directly or indirectly, the OnContentTell method or any other OnContentFoo method provides a functional result at objects or entities that are the contents of the room entity (e.g., 90) within which the event occurs. This functional result further reflects the propagation of the causal effect of the event.

Process block 330 indicates that an event notification method (e.g., OnFoo) is called at the object of the entity for which the event is fired, where "Foo" is the name of the event. In this example, the OnTell method is called at object 312 corresponding to avatar 92. The OnTell method may be executed either directly through the object (e.g., object 312) as a conventional defined object method or may be executed indirectly through a dynamic inheritance process described below.

If it is supported directly or indirectly, the OnTell method or any other OnFoo method provides a functional result at the "acting" entity 92 with which the triggering event (e.g., Tell) is associated. Providing the first event notification method at Self entity 92 provides an initial causal effect to be associated with the entity that the event is associated with.

Process block 332 indicates that an event notification method (e.g., OnPeerFoo) is called at the object of any other entity that is also contained in the space entity that contains the entity for which the event is fired. In this example, avatar 94 and articles 96 and 98 are in room 90 with, and hence peers of, avatar 92. The OnPeerTell method is called on the interface objects 312 and 318 corresponding to avatar 94 and articles 98 and 96.

The OnPeerTell method may be executed either directly through the object or objects (e.g., objects 312 and 318) as a conventional defined object method or may be executed indirectly through the dynamic inheritance process described below. If it is supported directly or indirectly, the OnPeerTell method or any other OnPeerFoo method provides functional results at the entities other than room 90 and self entity 92. These functional results reflect the conclusion of the propagation of the causal effect of the event throughout room 90.

Event mechanism process 320 provides notifications of events among objects according to their associational relationships. The OnFoo method at process block 326 represents a "first person" or "actor" event notification method that is called at an object corresponding to the entity with which an event is associated. The OnContentFoo method at process block 330 represents an area event notification at an entity containing the entity with which the event is associated. The OnPeerFoo method at process block 332 represents the final propagation of an event notification through an associated set of entities. This event notification sequence that represents the propagation of causal effects from an event and thereby provides an improved representation of a virtual world environment.

Event mechanism process 320 of FIG. 16 has been described as utilizing a dynamic inheritance process, which is described below. It will be appreciated, however, that utilizing the dynamic inheritance process in connection with event mechanism process 320 is but one implementation of this invention. In a alternative implementation, for example, event mechanism process 320 could be utilized with the dynamic inheritance process.

One embodiment of the claimed invention is a graphically rendered 3D VWE that includes various artifacts and avatars that may be associated with clients/users. The artifacts and avatars are disposed within an interconnected set of rooms. Further, objects such as avatars and/or artifacts may move through the portals connecting rooms, so that the entire length and breadth of the VWE may be explored by the clients associated with the objects. Also, the VWE may include some rooms having interactive games, puzzles, and/or informational resources that may be perceived by the users of avatars that are visiting those rooms. Furthermore, updates for a change in the VWE are only provided to those clients of a user that have an avatar disposed inside the bystander region associated with the change.

Another embodiment of the present invention entails graphically rendering a series of 3D chat rooms that are linked by portals in which participants of the chat session are represented by avatars. Each avatar is graphically rendered using a set of properties that are stored within the local database of at least one client or user represented by the avatar. The typical premise of a chat room is that a user represented by an avatar in the chat room can communicate with the other users represented by other avatars disposed within the same chat room. Local database updates are only provided to those clients having avatars positioned within the bystander region of a change in the VWE. Accordingly, the present invention is used as discussed above to handle a large number of users involved in a VWE chat session, but employs substantially less data transmission over the network and requires substantially less computational resources to respond to changes in the VWE than are required by the prior art techniques.

Another contemplated embodiment of the present invention employs a client to produce a display that selectively depicts a plurality of perception regions to a user. The perception regions do not necessarily correspond to the boundaries of perception and/or bystander regions for an object that is associated with the client employed by the user to produce the display. Instead, the user can selectively employ perception regions that are associated with other objects for portraying variously sized regions of the VWE. These perception regions can be selected to display various activities and/or locations within the VWE.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

The invention claimed is:

1. In a multi-user virtual world environment in which multiple users can simultaneously perceive and interact with the virtual world environment and with each other, virtual world environment software objects on a computer readable medium of a computer of a user and corresponding to a presentation within the virtual world environment, comprising:

a presentation room object having a ShowletMap property associated with the presentation room object, and identifying plural show item objects that each represent presentation information; and plural show item objects that are identified in the ShowletMap property associated with the presentation room object and including multimedia properties for presenting the presentation information in a multimedia format provided from the server to the multiple client computers.

2. The objects of claim 1 further comprising showlet interface objects that communicate with the show item objects to render the presentation information in the multimedia format at the computer of the user.

3. The objects of claim 2 in which each of the showlet interface objects that renders presentation information at the computer in a one-to-one relation with one of the show item objects.

4. The objects of claim 3 in which the showlet interface and show item objects in one-to-one relation to each other each include a property referencing the other.

5. The object of claim 1 further comprising a hierarchical relationship property indicating a hierarchical relationship between the object at least one other object.

6. In an object oriented multi-user domain in which multiple users can simultaneously perceive and interact with the domain and with each other, a persistent object oriented multi-user domain method in which objects are distributed between computer readable media associated with a server computer and plural client computers with corresponding users, comprising:

maintaining presentation element objects having multimedia presentation features that include properties including client computer output information, at the server computer;

conveying the presentation element objects having multimedia presentation features to the plural client computers;

communicating the client computer output information from the presentation element objects having multimedia presentation features to showlet interface objects at the client computers; and providing to the showlet interface objects, outputs corresponding to the output information from the presentation element objects.

7. The method of claim 6 in which the showlet interface objects further obtain inputs from users at the client computers and communicate the inputs to the presentation element objects.

8. The method of claim 7 further comprising updating the presentation element objects at the client computers to provide updated model objects and providing at the client computers updated outputs corresponding to the updated model objects.

9. The method of claim 6 in which each of the showlet interface objects that provides output at a client computer is in a one-to-one relation with one of the presentation element objects.

10. The method of claim 9 in which the showlet interface and presentation element model objects in one-to-one relation to each other each include a property referencing the other.

11. The method of claim 6 in which the presentation element objects represent a presentation virtual world and at least one of the users is a presenter who controls the presentation element objects to convey information to multiple other users.

12. The method of claim 6 in which each presenter is assigned a presenter role and each of the other users is assigned a viewer role.

* * * * *